United States Patent
Nihey et al.

(10) Patent No.: US 11,511,229 B2
(45) Date of Patent: Nov. 29, 2022

(54) NANOCARBON SEPARATION METHOD

(71) Applicant: NEC CORPORATION, Tokyo (JP)

(72) Inventors: Fumiyuki Nihey, Tokyo (JP); Hideaki Numata, Tokyo (JP); Yuki Kuwahara, Tsukuba (JP); Takeshi Saito, Tsukuba (JP); Fusako Sasaki, Tsukuba (JP)

(73) Assignee: NEC CORPORATION, Tokyo (JP)

( * ) Notice: Subject to any disclaimer, the term of this patent is extended or adjusted under 35 U.S.C. 154(b) by 663 days.

(21) Appl. No.: 16/486,520

(22) PCT Filed: Sep. 29, 2017

(86) PCT No.: PCT/JP2017/035737
§ 371 (c)(1),
(2) Date: Aug. 16, 2019

(87) PCT Pub. No.: WO2018/159001
PCT Pub. Date: Sep. 7, 2018

(65) Prior Publication Data
US 2020/0047122 A1 Feb. 13, 2020

(30) Foreign Application Priority Data
Feb. 28, 2017 (WO) .................. PCT/JP2017/077753

(51) Int. Cl.
*B01D 57/02* (2006.01)
*C01B 32/172* (2017.01)
*B03C 5/02* (2006.01)

(52) U.S. Cl.
CPC ................ *B01D 57/02* (2013.01); *B03C 5/02* (2013.01); *C01B 32/172* (2017.08); *C01B 2202/02* (2013.01); *C01B 2202/22* (2013.01)

(58) Field of Classification Search
CPC ......... B01D 57/02; B03C 5/02; C01B 32/172; C01B 2202/02; C01B 2202/22;
(Continued)

(56) References Cited

U.S. PATENT DOCUMENTS

2012/0103809 A1* 5/2012 Ihara .................... C01B 32/172
204/600

FOREIGN PATENT DOCUMENTS

JP 2005-527455 A 9/2005
JP 2008-55375 A 3/2008
(Continued)

OTHER PUBLICATIONS

Blanch, et al., Optimizing Surfactant Concentrations for Dispersion of Single-Walled Carbon Nanotubes in Aqueous Solution, J. Phys. Chem. B2010; 114: 9805-9811 (Year: 2010).*
(Continued)

*Primary Examiner* — Daniel C. McCracken
(74) *Attorney, Agent, or Firm* — Sughrue Mion, PLLC

(57) ABSTRACT

A nanocarbon separation method includes: a step of preparing a plurality of liquids with different specific gravities in which at least one of the plurality of liquids is a dispersion liquid in which a mixture of nanocarbons with different properties is dispersed; a step of sequentially injecting the plurality of liquids into an electrophoresis tank so that the specific gravities of the liquids decrease from a bottom to a top of the liquids in a direction of gravitational force; and a step of separating the mixture of the nanocarbons by moving (Continued)

a part of the mixture toward an electrode side disposed in an upper part of the electrophoresis tank and moving a remainder of the mixture toward an electrode side disposed in a lower part of the electrophoresis tank by applying a direct current voltage to the electrodes.

17 Claims, 29 Drawing Sheets

(58) Field of Classification Search
CPC ..... C01B 32/15; C01B 32/158; C01B 32/159; C01B 32/16; C01B 32/162; C01B 32/164; C01B 32/166; C01B 32/168; C01B 32/17; C01B 32/174; C01B 32/176; C01B 32/178; C01B 2202/00; C01B 2202/04; C01B 2202/06; C01B 2202/08; C01B 2202/10; C01B 2202/20; C01B 2202/24; C01B 2202/26; C01B 2202/28; C01B 2202/30; C01B 2202/32; C01B 2202/34; C01B 2202/36; B82Y 30/00; B82Y 40/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

FOREIGN PATENT DOCUMENTS

| | | |
|---|---|---|
| JP | 2008-266112 A | 11/2008 |
| JP | 2008-285386 A | 11/2008 |
| WO | 2006/013788 A1 | 2/2006 |
| WO | 2008/143281 A1 | 11/2008 |
| WO | 2010/150808 A1 | 12/2010 |
| WO | 2011/102322 A1 | 8/2011 |

OTHER PUBLICATIONS

International Search Report for PCT/JP2017/035737 dated Oct. 31, 2017 [PCT/ISA/210].
International Search Report for PCT/JP2017/007753 dated Apr. 11, 2017 [PCT/ISA/210].

* cited by examiner

NANOCARBON SEPARATION METHOD

The present invention relates to a nanocarbon separation method.

This application is a National Stage of International Application No. PCT/JP2017/035737, filed on Sep. 29, 2017, which claims priority from Priority is claimed on PCT International Application No. PCT/JP2017/007753, filed Feb. 28, 2017, the content of which is incorporated herein by reference.

BACKGROUND ART

In recent years, carbon materials having a size in a nanometer range (hereinafter referred to as "nanocarbons") are expected to be applied to various fields due to their mechanical properties, electrical properties, chemical properties, and the like.

In the case of nanocarbons, nanocarbons with different properties are simultaneously produced in a manufacturing stage in some cases. When nanocarbons with different electrical characteristics are used in an electronic material when mixed together, a problem such as the deterioration in the characteristics thereof is likely to be caused. Thus, it is necessary to separate nanocarbons with different properties.

In order to separate nanocarbons, Patent Document 1 describes a nanocarbon material separation method which includes: a step of introducing a dispersion solvent including nanocarbon materials dispersed in nanocarbon micelle groups having a plurality of different charges and introducing a holding solution having a specific gravity different from that of the nanocarbon materials into an electrophoresis tank by laminating the solutions by disposing them in a predetermined direction; and a step of separating the nanocarbon micelle groups into two or more nanocarbon micelle groups by applying a voltage in a serial direction to the introduced, disposed, and laminated dispersion liquid and holding solution.

PRIOR ART DOCUMENTS

Patent Documents

[Patent Document 1] PCT International Publication No. WO2010/150808

SUMMARY OF THE INVENTION

Problem to be Solved by the Invention

However, the nanocarbon separation method described in Patent Document 1 has a problem in the efficiency of separation. That is to say, in the nanocarbon separation method described in Patent Document 1, some time is taken to perform the separation.

An object of the present invention is to provide a nanocarbon separation method in which the separation efficiency can be improved and the time required for separation can be shortened when nanocarbons with different properties are separated.

Means for Solving the Problem

A nanocarbon separation method according to the present invention includes: a step of preparing a plurality of liquids with different specific gravities in which at least one of the plurality of liquids is a dispersion liquid in which a mixture of nanocarbons with different properties is dispersed; a step of sequentially injecting the plurality of liquids into an electrophoresis tank so that the specific gravities of the liquids decrease from a bottom to a top of the liquids in a direction of gravitational force; and a step of separating the mixture of the nanocarbons by moving a part of the mixture of the nanocarbons toward an electrode side disposed in an upper part of the electrophoresis tank and moving a remainder of the mixture of the nanocarbons toward an electrode side disposed in a lower part of the electrophoresis tank by applying a direct current voltage to the electrodes disposed in the upper part and the lower part.

Effect of the Invention

According to the present invention, the separation efficiency can be improved when nanocarbons having different properties are separated and the time required for separation can be shortened when nanocarbons with different properties are separated.

EMBODIMENTS FOR CARRYING OUT THE INVENTION

Figure 1:
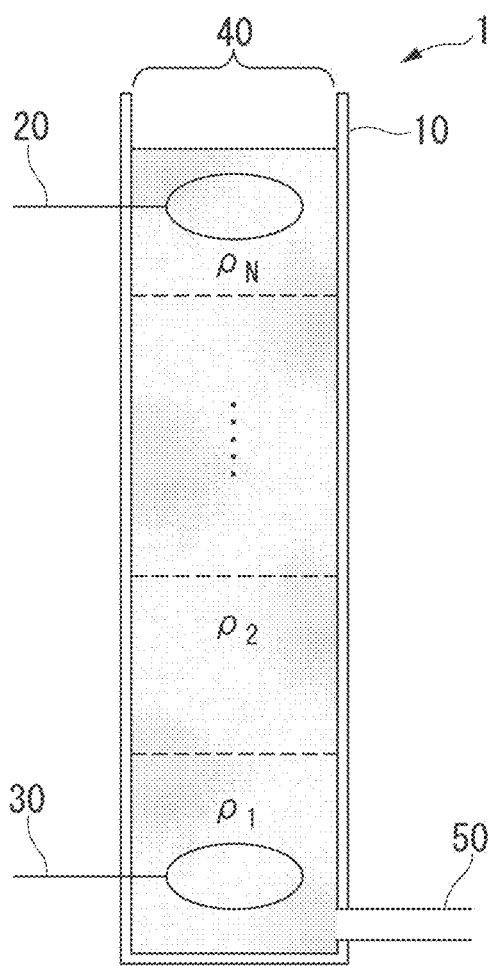
FIG. 1 is a schematic diagram showing one example of a separation apparatus according to a first embodiment.

A nanocarbon separation method according to an embodiment will be described below with reference to the drawings.

In the embodiment, nanocarbon materials refer to carbon materials mainly composed of carbon including single-walled carbon nanotubes, double-walled carbon nanotubes, multi-walled carbon nanotubes, carbon nanohorns, carbon nanotwists, graphenes, fullerenes, and the like. As an example regarding nanocarbons, the case of separating single-walled carbon nanotubes of a semiconducting type and single-walled carbon nanotubes of a metallic type from a dispersion liquid containing single-walled carbon nanotubes will be described in detail.

(1) Single-Walled Nanocarbon Tubes

It is known that single-walled carbon nanotubes can be divided into two different types, i.e., those having metallic properties and those having semiconducting properties in accordance with a diameter and a winding manner of tubes. When single-walled carbon nanotubes are synthesized using currently known manufacturing methods, mixed materials including single-walled carbon nanotubes which include single-walled carbon nanotubes having metallic properties (hereinafter referred to as "metallic single-walled carbon nanotubes") and single-walled carbon nanotubes having semiconducting properties (hereinafter referred to as "semiconducting single-walled carbon nanotubes") at a statistical ratio of 1:2 are obtained.

It should be noted that, in the following description, single-walled carbon nanotubes in which metallic single-walled carbon nanotubes and semiconducting single-walled carbon nanotubes are mixed together are referred to as a single-walled carbon nanotube mixture. The single-walled carbon nanotube mixture is not particularly limited as long as the single-walled carbon nanotube mixture contains metallic single-walled carbon nanotubes and semiconducting single-walled carbon nanotubes. Furthermore, single-walled carbon nanotubes in the embodiment may be independently single-walled carbon nanotubes or may be single-walled carbon nanotubes in which some carbon atoms are substituted with arbitrary functional groups or single-walled carbon nanotubes in which some carbon atoms are modified by arbitrary functional groups.

An example in which a dispersion liquid in which a single-walled carbon nanotube mixture is dispersed in a dispersion medium is separated into single-walled carbon nanotubes of a semiconducting type and single-walled carbon nanotubes of a metallic type will be described in detail below.

(2) Dispersion Liquid of Single-Walled Carbon Nanotube Mixture

A dispersion liquid of a single-walled carbon nanotube mixture (referred to as a "single-walled carbon nanotube dispersion liquid") in the embodiment is a liquid in which a single-walled carbon nanotube mixture is dispersed in a dispersion medium. It is desirable to use water or heavy water as the dispersion medium for the dispersion liquid. However, a dispersion medium such as an organic solvent and an ionic liquid may be used as long as the dispersion medium is a dispersion medium which can disperse single-walled carbon nanotubes. As an auxiliary material used for dispersing a single-walled carbon nanotube mixture in a dispersion medium, a non-ionic surfactant, a cationic surfactant, an anionic surfactant, another dispersion auxiliary agent, and the like may be used. Particularly, it is desirable to use a non-ionic surfactant. The non-ionic surfactant will be described later. A method of preparing the dispersion liquid will also be described later.

First Embodiment (Separation Apparatus)

A separation apparatus used in the nanocarbon separation method in the embodiment will be described below.

FIG. 1 is a schematic diagram showing one example of a separation apparatus used in the separation method according to the embodiment.

A separation apparatus 1 in the embodiment includes an electrophoresis tank 10 having an I-shaped (vertical) structure, an electrode 20 disposed in an upper part in the electrophoresis tank 10, an electrode 30 disposed in a lower part in the electrophoresis tank 10, an injection port 40 through which a liquid is injected into the electrophoresis tank 10, and a recovery port 50 through which a liquid is recovered from the electrophoresis tank 10.

The electrophoresis tank 10 has a space in which a liquid can be accommodated. A single-walled carbon nanotube dispersion liquid to be separated is injected into the electrophoresis tank 10 and a carbon nanotube mixture is separated therein. Any material may be adopted for the electrophoresis tank 10 as long as the material is an insulating material. For example, glass, quartz, an acrylic resin, and the like can be used as the material of the electrophoresis tank 10.

The electrophoresis tank 10 having an I-shaped structure is a container having a hollow tubular shape. The electrophoresis tank 10 having an I-shaped structure has an opening in an upper end thereof. A lower end of the electrophoresis tank 10 having an I-shaped structure is closed and forms the bottom of the container.

The electrophoresis tank 10 having an I-shaped structure is provided so that a longitudinal direction thereof is erected on the horizontal plane.

Also, the electrophoresis tank 10 having a U-shaped structure which will be described later is a container having a shape in which both ends of a hollow tube are bent to extend to be aligned in one direction. In the electrophoresis tank 10 having a U-shaped structure, openings are provided at both ends thereof extending to be aligned in one direction. The bent portion forms the bottom of the container.

The electrophoresis tank 10 having a U-shaped structure is erected so that both ends thereof extending to be aligned in one direction extend upward with respect to the horizontal plane.

When a voltage is applied to the electrode 20 and the electrode 30, the single-walled carbon nanotube mixture is separated into metallic single-walled carbon nanotubes and semiconducting carbon nanotubes. The metallic single-walled carbon nanotubes collect near a negative electrode. On the other hand, the semiconducting single-walled carbon nanotubes collect near a positive electrode. For this reason, it is desirable to dispose the electrode 20 and the electrode 30 at an upper end portion and a lower end portion of the electrophoresis tank 10. It is more desirable to dispose a positive electrode in a lower part of the electrophoresis tank 10 and to dispose a negative electrode in an upper part of the electrophoresis tank 10. When the electrode 30 is used as the positive electrode and the electrode 20 is used as the negative electrode, an electric field Z is directed upward from the bottom of the electrophoresis tank 10. On the other hand, when the electrode 30 disposed in the lower part of the electrophoresis tank 10 is used as the negative electrode and the electrode 20 disposed in the upper part of the electrophoresis tank 10 is used as the positive electrode, the electric field Z is directed downward from the top of the electrophoresis tank 10. Here, in the case of the upward direction and the downward direction, a direction upward in a direction of gravitational force indicates the upward direction and a direction downward in the direction of gravitational force indicates the downward direction when the separation apparatus 1 is installed in a usable state. Platinum or the like can be used as a material of the electrodes 20 and 30.

The injection port 40 is an opening through which a liquid is injected into the electrophoresis tank 10. The injection port 40 in the embodiment is an opening provided at the upper end of the electrophoresis tank 10.

The recovery port 50 is an opening through which a liquid is recovered from the electrophoresis tank 10. The recovery port 50 may be provided at the lower end of the electrophoresis tank 10. When a plurality of recovery ports 50 are provided, it is desirable to provide the recovery ports near the electrodes 20 and 30. Since the separated metallic single-walled carbon nanotubes move to the vicinity of the negative electrode and the semiconducting single-walled carbon nanotubes move to the vicinity of the positive electrode, the moved single-walled carbon nanotubes can be efficiently recovered.

Although a constitution in which the injection port 40 and the recovery ports 50 are provided has been shown in the example shown in FIG. 1, the constitution of the separation apparatus 1 is not limited thereto. For example, the injection port 40 may also be used as one of the recovery ports 50.

(Nanocarbon Separation Method)

Figure 2:
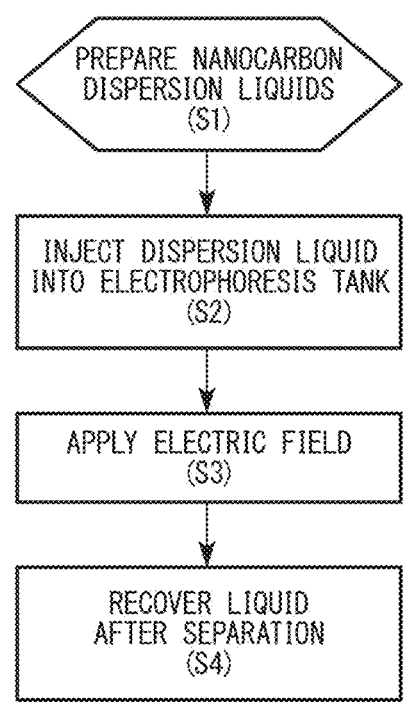
FIG. 2 is a flowchart showing a nanocarbon separation method according to the first embodiment.

The nanocarbon separation method according to the embodiment will be described below. FIG. 2 is a flowchart showing the nanocarbon separation method in the embodiment.

First, in a first step (S1), a plurality of liquids with different specific gravities are prepared. At least one of the plurality of liquids is a single-walled carbon nanotube dispersion liquid. The plurality of liquids with different specific gravities are liquids in which a predetermined solute is contained in a predetermined solvent. As the predetermined solute, for example, a surfactant can be used. Furthermore, as the predetermined solvent, it is desirable to use water or heavy water. In addition, a liquid mixture of water and heavy water can also be used as the dispersion medium for the dispersion liquid. By adjusting a concentration of a surfactant that is a solute, a specific gravity can be adjusted. For example, heavy water can be used as the dispersion medium and a surface, specifically, polyoxyethylene (100) stearyl ether (Brij S100 [trade name] manufactured by Sigma-Aldrich Co. LLC) that is a non-ionic surfactant can be used as a solute. In this case, a 1 wt % heavy water solution of Brij S100 at room temperature (25° C.) has a specific gravity higher than that of a 0.5 wt % heavy water solution of Brij S100.

Next, a method of acquiring a single-walled carbon nanotube dispersion liquid is not particularly limited and known methods can be applied as the method. For example, when a single-walled carbon nanotube mixture and a dispersion medium are mixed together and subjected to ultrasonic treatment, the single-walled carbon nanotube mixture is dispersed in the dispersion medium. Alternatively, single-walled carbon nanotubes can also be dispersed in the dispersion medium using a mechanical shear force. The single-walled carbon nanotube dispersion liquid may contain a dispersion auxiliary agent such as a surfactant in addition to the single-walled carbon nanotube mixture and the dispersion medium.

Subsequently, in a second step (S2), the liquids prepared in the first step are injected into the electrophoresis tank 10 so that the specific gravities of the liquids decrease from the bottom to the top thereof in a direction of gravitational force irrespective of whether or not the liquids contain single-walled carbon nanotubes.

To be specific, a liquid having a highest specific gravity among the prepared liquids is put into the electrophoresis tank 10. Subsequently, a liquid having a second highest specific gravity among the prepared liquids is put into the electrophoresis tank 10. After that, the other liquids are put into the electrophoresis tank 10 in order from a liquid having a higher specific gravity. This makes it possible to form a specific gravity gradient in which the specific gravities of the liquids decrease from the bottom to the top thereof in the direction of gravitational force in the electrophoresis tank. The liquids may be gently put into the electrophoresis tank, for example, using a pipette.

In a third step (S3), a direct current (DC) voltage is applied to the electrophoresis tank. Metallic single-walled carbon nanotubes in the carbon nanotube mixture dispersed in each of the liquids move to the vicinity of the negative electrode and semiconducting single-walled carbon nanotubes move toward the positive electrode side. As a result, the carbon nanotube mixture dispersed in each of the liquids can be separated into a metallic type and a semiconducting type. In the case of using a liquid having a non-ionic surfactant dissolved therein, metallic single-walled carbon nanotubes have a positive charge in the liquids and semiconducting single-walled carbon nanotubes have a very weak negative charge. Furthermore, after voltage application, the semiconducting single-walled carbon nanotubes tend to have a specific gravity higher than that of the metallic single-walled carbon nanotubes. The single-walled carbon nanotube mixture is separated into a metallic type and a semiconducting type due to a combined force of a moving force generated due to a difference between the specific gravities and an electrophoretic force generated due to an electric field and charges.

In the case of a voltage to be applied, an optimal value thereof needs to be determined using a composition of the dispersion medium and an amount of charge of the single-walled carbon nanotube mixture. When water, heavy water, or the like is used as the dispersion medium, an application voltage applied between electrodes which are farthest away from each other can be an arbitrary value greater than 0 V and 1000 V or less (0 to 1000 V). Particularly, since water and heavy water minimize the effects of electrolysis, it is desirable to apply a voltage in a range of greater than 0 V and 120 V or less (0 to 120 V).

Finally, in a fourth step (S4), the separated liquid is recovered. The separated liquid is recovered through the recovery ports 50 in a state in which a voltage is applied. It should be noted that any methods may be used for the recovery as long as samples do not diffuse and become mixed. For example, a method of stopping applying the voltage and gently suctioning the separated liquid using a pipette every 1 mL, and a method of inserting partitioning plates into a separation flow path and recovering a liquid in each block may be used.

Thus, the single-walled carbon nanotube mixture can be separated into the metallic single-walled carbon nanotubes and the semiconducting single-walled carbon nanotubes. It should be noted that the first to fourth steps may be repeatedly performed using the recovered liquid obtained in the fourth step. By repeatedly performing the first to fourth steps, the purity of the metallic single-walled carbon nanotubes and the semiconducting single-walled carbon nanotubes can be improved.

It should be noted that, although an example in which the single-walled carbon nanotube mixture is separated into the metallic single-walled carbon nanotubes and the semiconducting single-walled carbon nanotubes has been described in the foregoing description, the present invention is not limited thereto. For example, this may be performed as a purification method of single-walled carbon nanotubes in which only single-walled carbon nanotubes having desired properties are recovered after separation is performed in the electrophoresis tank 10.

The separation efficiency of the recovered sample can be evaluated using a method such as a microscopic Raman spectroscopic analysis (a change in Ranlan spectrum in a radial breathing mode (RBM) region and a change in Raman spectrum shape in a Breit-Wigner-Fano (BWF) region), ultraviolet visible near-infrared absorption spectrophotometry (a change in peak shape in an absorption spectrum), and the like. Furthermore, it is also possible to evaluate the separation efficiency by evaluating the electrical properties of the single-walled carbon nanotubes. For example, it is possible to evaluate a sample by preparing a field effect transistor and measuring the transistor characteristics thereof.

In the above description, an example of using polyoxyethylene (100) stearyl ether (Brij S100 [trade name] manufactured by Sigma-Aldrich Co. LLC) as a non-ionic surfactant has been described. However, the non-ionic surfactant is not limited thereto.

As a non-ionic surfactant, it is possible to use one non-ionic surfactant including a non-ionizing hydrophilic site and a hydrophobic site such as an alkyl chain or a combination of a plurality of non-ionic surfactants each of which includes a non-ionizing hydrophilic site and a hydrophobic site such as an alkyl chain. For example, a non-ionic surfactant having a polyethylene glycol structure represented by a polyoxyethylene alkyl ether type, an alkyl glucoside type non-ionic surfactant, and the like can be used. Furthermore, it is desirable to use non-ionic surfactants defined by polyoxyethylene (n) alkyl ether (n is 10 or more and 100 or less; and in which an alkyl chain length is C12 or more and C18 or less). For example, polyoxyethylene (23) lauryl ether (Brij L23 [trade name] manufactured by Sigma-Aldrich Co. LLC), polyoxyethylene (20) cetyl ether (Brij C20 [trade name] manufactured by Sigma-Aldrich Co. LLC), polyoxyethylene (20) stearyl ether (Brij S20 [trade name] manufactured by Sigma-Aldrich Co. LLC), polyoxyethylene (10) oleyl ether (Brij O10 [trade name] manufactured by Sigma-Aldrich Co. LLC), polyoxyethylene (10) cetyl ether (Brij O10 [trade name] manufactured by Sigma-Aldrich Co. LLC), polyoxyethylene (10) stearyl ether (Brij S10 [trade name] manufactured by Sigma-Aldrich Co. LLC), polyoxyethylene (20) oleyl ether (Brij O20 [trade name] manufactured by Sigma-Aldrich Co. LLC and polyoxyethylene (100) stearyl ether (Brij S100 [trade name] manufactured by Sigma-Aldrich Co. LLC), and the like can be used.

(Modified Examples of Separation Apparatus)

Figure 3:
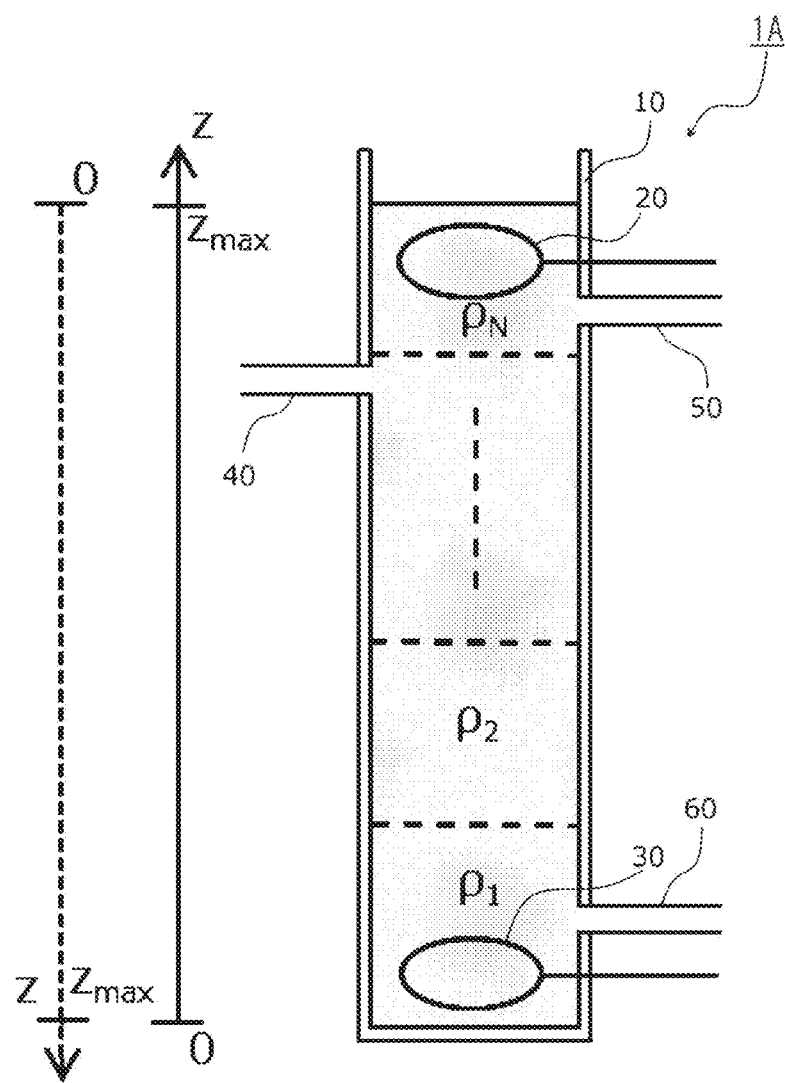
FIG. 3 is a schematic diagram showing a modified example of the separation apparatus according to the first embodiment.
Figure 4:
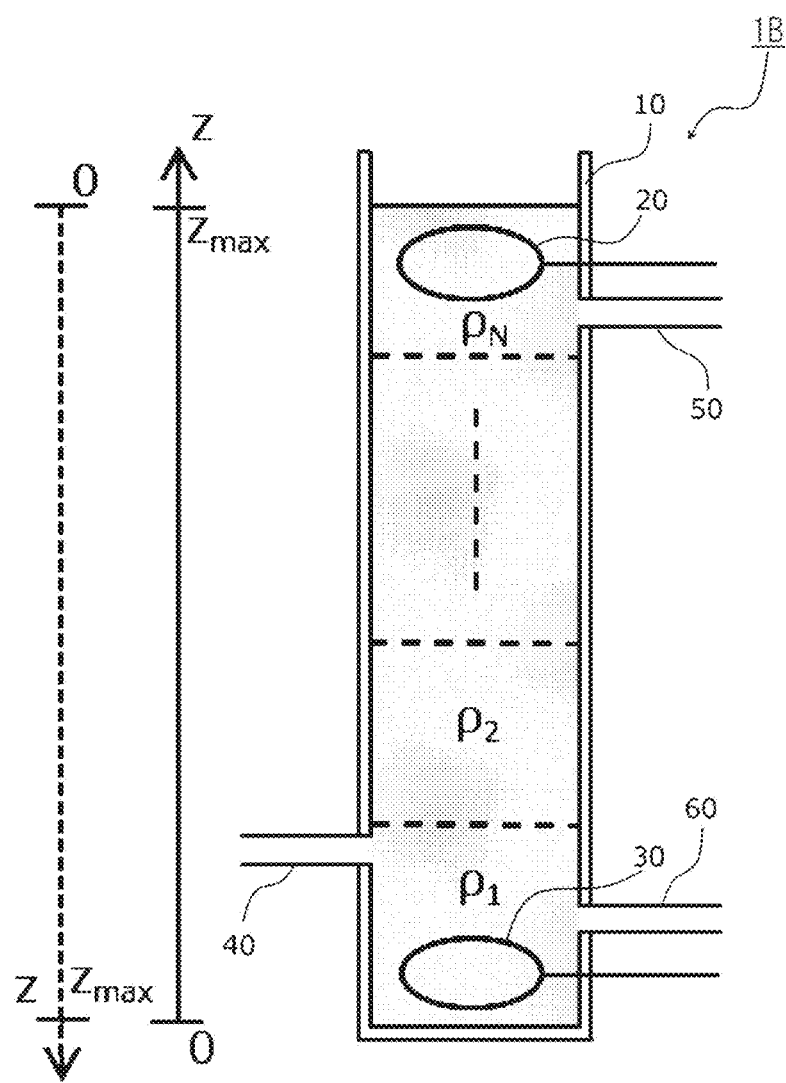
FIG. 4 is a schematic diagram showing another modified example of the separation apparatus according to the first embodiment.
Figure 5:
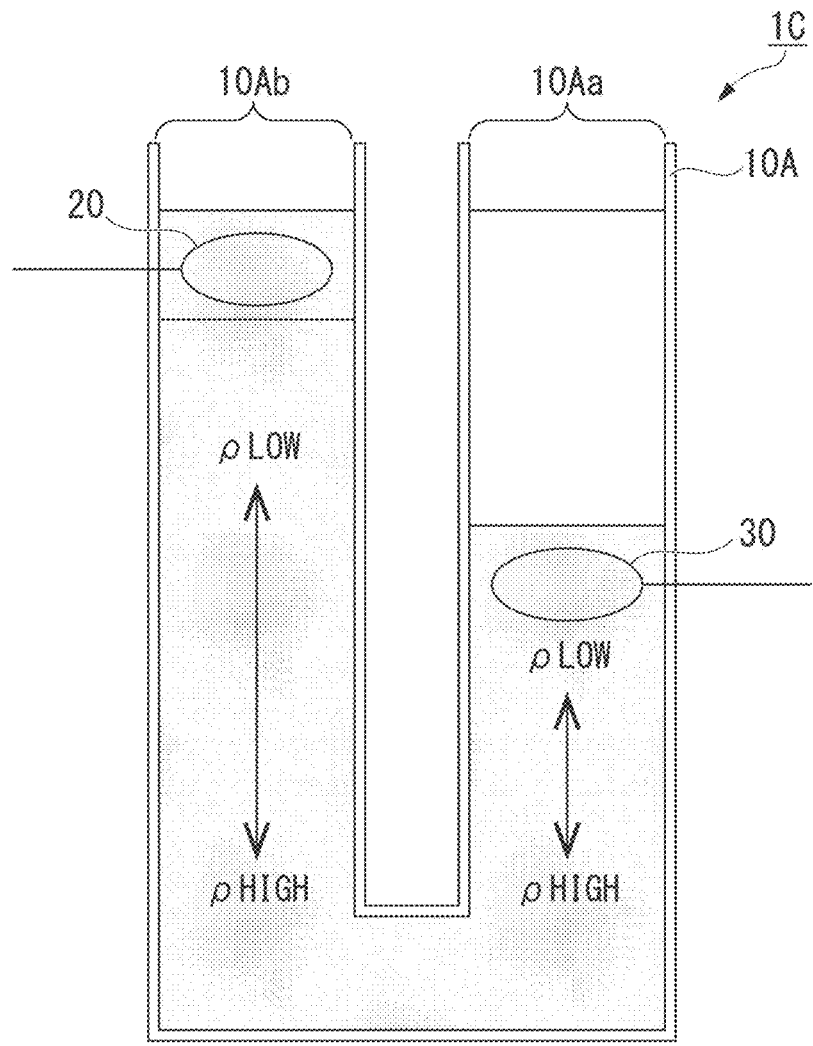
FIG. 5 is a schematic diagram showing yet another modified example of the separation apparatus according to the first embodiment.

FIGS. 3 to 5 show modified examples of the separation apparatus 1.

A separation apparatus 1A shown in FIG. 3 includes an electrophoresis tank 10 having an I-shaped (vertical) structure, an electrode 20 disposed in an upper part in the electrophoresis tank 10, an electrode 30 disposed in a lower part in the electrophoresis tank 10, an injection port 40, a recovery port 50 provided near the electrode 20, and a recovery port 60 provided near the electrode 30. The injection port 40 is provided above halfway in a height direction of the electrophoresis tank 10 and below the recovery port 50.

A separation apparatus 1B shown in FIG. 4 includes an injection port 40 provided at a position which is below halfway in the height direction of the electrophoresis tank 10 and above a recovery port 60. It is desirable to dispose the recovery port 50 near the electrode 20 and it is desirable to dispose the recovery port 60 near the electrode 30. Furthermore, recovery may be performed using the injection port 40 provided at the lower part of the electrophoresis tank 10 instead of using the recovery port 50 or the recovery port 60. At that time, first, a semiconducting single-walled carbon nanotube layer is recovered, and then a metallic single-walled carbon nanotube layer is recovered.

A separation apparatus 1C shown in FIG. 5 has a U-shaped structure. An electrophoresis tank 10A of the separation apparatus 1C is an electrophoresis tank 10A having a U-shaped structure of which both ends open upward. Openings of both ends of the electrophoresis tank 10A serve as an injection port 40 and a recovery port 50. An electrode 20 is provided on one side of the two U-shaped ends and an electrode 30 is provided on the other end. It should be noted that it is desirable that the height position of one electrode be higher than the height position of the other electrode. It is more desirable that the positive electrode be disposed lower than the negative electrode.

Although an embodiment applicable to separation of metallic type and semiconducting type single-walled carbon nanotubes has been described above, the present invention can also be applied to other nanocarbons, that is, multi-walled carbon nanotubes, double-walled carbon nanotubes, graphene, and the like.

By using the nanocarbon separation method according to the embodiment, the separation efficiency can be improved when nanocarbons with different properties are separated.

Also, by using the nanocarbon separation method according to the embodiment, the dispersion liquid becomes stabilized in the electrophoresis tank. As a result, it is possible to enhance the purity of the separated nanocarbons.

Furthermore, in the nanocarbon separation method using the separation apparatus 1, if a temperature gradient is generated in the electrophoresis tank 10, a convection phenomenon of the single-walled carbon nanotube dispersion liquid may occur in the electrophoresis tank 10 in some cases. As a result, it becomes impossible to stably separate metallic single-walled carbon nanotubes and semiconducting single-walled carbon nanotubes contained in the single-walled carbon nanotube dispersion liquid. Thus, it is desirable that the separation apparatus 1 include a temperature adjustment means for keeping a temperature of the single-walled carbon nanotube dispersion liquid in the electrophoresis tank 10 constant. The temperature adjustment means is not particularly limited and any means which can keep the temperature of the liquids accommodated in the container constant such as, for example, a water cooling jacket can be used.

Second Embodiment (Separation Apparatus)

Figure 6:
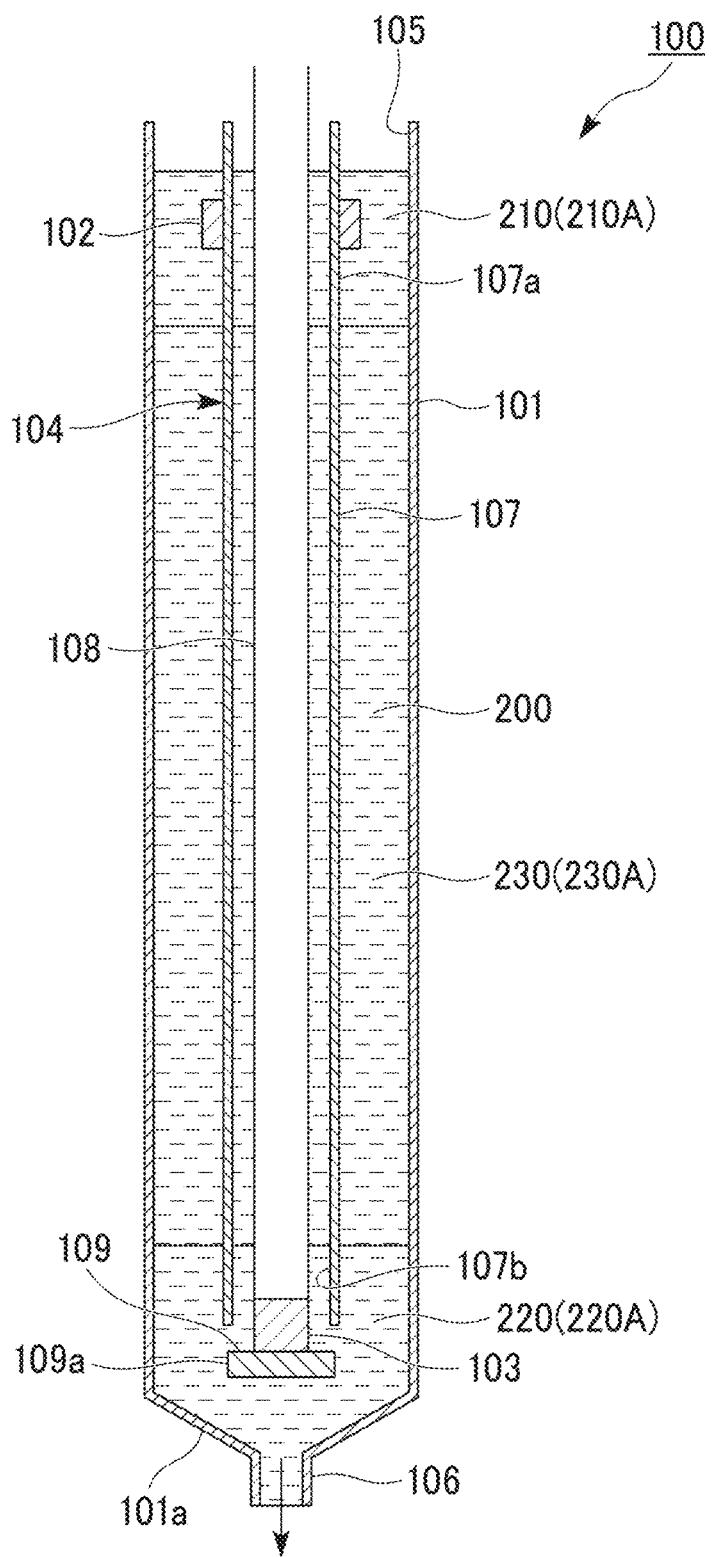
FIG. 6 is a schematic diagram showing one example of a separation apparatus according to a second embodiment.

FIG. 6 is a schematic diagram showing an example of a separation apparatus used in a nanocarbon separation method according to an embodiment.

A separation apparatus 100 in the embodiment includes an electrophoresis tank 101 having an I-shaped (vertical) structure and an electrode member 104 which includes a first electrode 102 provided in an upper part in the electrophoresis tank 101 and a second electrode 103 provided in a lower part in the electrophoresis tank 101.

The electrophoresis tank 101 includes the upper end having an opening portion 105 provided therein. Furthermore, the electrophoresis tank 101 includes the lower end having an injection/recovery port 106 provided therein communicating with an outer bottom surface 101a of the electrophoresis tank 101. The injection/recovery port 106 is used for injecting a nanocarbon dispersion liquid 200 into the electrophoresis tank 101 and recovering the nanocarbon dispersion liquid 200 from the electrophoresis tank 101. In addition, the injection/recovery port 106 includes a closed structure (not shown) such as a rotary cock having a fit.

It is possible to perform the injection/recovery operation without needing to move the injection/recovery port in accordance with a change in liquid level at the time of injecting/recovering and without disturbing a liquid phase interface inside the electrophoresis tank 101, by gently injecting and recovering the nanocarbon dispersion liquid 200 using, for example, a peristaltic pump or the like via the injection/recovery port 106 in a bottom portion of the electrophoresis tank 101. Furthermore, when the capacity of the electrophoresis tank 101 is increased, it is very rational without providing a long injection/recovery nozzle.

The electrode member 104 includes an insulating cylindrical member 107, an insulating columnar member 108 inserted into the cylindrical member 107, the first electrode 102 provided on an outer circumferential surface 107a of the cylindrical member 107, and the second electrode 103 provided at a lower end portion of the columnar member 108. Furthermore, the first electrode 102 is provided at an upper end portion of the cylindrical member 107. In the separation apparatus 100 in the embodiment, the first electrode 102 is a negative electrode and the second electrode 103 is a positive electrode.

The cylindrical member 107 extends substantially over the entire region in the height direction of the electrophoresis tank 101.

The columnar member 108 extends substantially over the entire region in the height direction of the electrophoresis tank 101 in a state in which the columnar member 108 is inserted into the cylindrical member 107. Furthermore, the columnar member 108 is movable in the height direction of the electrophoresis tank 101 in a state in which the columnar member 108 is inserted into the cylindrical member 107. In addition, a plate-like fitting member 109 inscribed in a lower end portion of the cylindrical member 107 by moving the columnar member 108 upward in the height direction of the electrophoresis tank 101 is provided at a lower end of the columnar member 108. A side surface 109a of the fitting member 109 has a shape similar to that of an inner side surface 107b of the lower end portion of the cylindrical member 107. Thus, by moving the columnar member 108 upward in the height direction of the electrophoresis tank 101, the fitting member 109 is inscribed in the lower end portion of the cylindrical member 107 and fitted. On the other hand, by moving the columnar member 108 downward in the height direction of the electrophoresis tank 101, it is possible to provide a gap between the lower end of the cylindrical member 107 and the fitting member 109. When metallic nanocarbon and semiconducting nanocarbon contained in the nanocarbon dispersion liquid 200 is separated using carrier-free electrophoresis, a gap is provided between the lower end of the cylindrical member 107 and the fitting member 109. In this state, when a DC voltage is applied to the first electrode 102 and the second electrode 103, a pH gradient is formed in the nanocarbon dispersion liquid 200 in the electrophoresis tank 101. It should be noted that, even when a gap is provided between the lower end of the cylindrical member 107 and the fitting member 109, it is desirable that most of the second electrode 103 be disposed in the cylindrical member 107.

Examples of the material of the electrophoresis tank 101 include the same material as the material of the electrophoresis tank 10.

Examples of the first electrode 102 and the second electrode 103 include the same electrodes as the electrodes 20 and 30.

The materials of the cylindrical member 107, the columnar member 108, and the fitting member 109 are not particularly limited as long as the materials are stable with respect to the nanocarbon dispersion liquid 200 and are an insulating material. However, for example, glass, quartz, an acrylic resin, and the like are exemplary examples. It is desirable that a portion in the fitting member 109 facing the lower end of the cylindrical member 107 be a flexible material such as silicone rubber.

In the separation apparatus 100 in the embodiment, a case in which the first electrode 102 is the negative electrode and the second electrode 103 is the positive electrode has been described, but the separation apparatus 100 in the embodiment is not limited thereto. In the separation apparatus 100 in the embodiment, the first electrode 102 may be a positive electrode and the second electrode 103 may be a negative electrode.

Furthermore, in the nanocarbon separation method using the separation apparatus 100 which will be described later, if a temperature gradient is generated in the electrophoresis tank 101, a convection phenomenon of the nanocarbon dispersion liquid 200 may occur in the electrophoresis tank 101 in some cases. As a result, it becomes impossible to stably separate metallic nanocarbon and semiconducting nanocarbon contained in the nanocarbon dispersion liquid 200. Thus, it is desirable that the separation apparatus 100 include a temperature adjustment means for keeping a temperature of the nanocarbon dispersion liquid 200 in the electrophoresis tank 101 constant. The temperature adjustment means is not particularly limited and any means which can keep the temperature of the liquids accommodated in the container constant such as, for example, a water cooling jacket can be used.

(Nanocarbon Separation Method)

The nanocarbon separation method using the separation apparatus 100 will be described and an action of the separation apparatus 100 will be described with reference to FIG. 6.

The nanocarbon separation method in the embodiment includes a step of preparing a plurality of liquids with different specific gravities in which at least one of the plurality of liquids is a dispersion liquid having a mixture of nanocarbons with different properties dispersed therein (referred to as a "preparation step"), a step of sequentially injecting the plurality of liquids into the electrophoresis tank so that the specific gravities of the liquids decrease from the bottom to the top thereof in a direction of gravitational force (referred to as an "injection step"), and a step of separating the mixture by moving a part of the mixture of the nanocarbons toward the electrode side disposed in the upper part and moving the remainder of the mixture of the nanocarbons toward the electrode side disposed in the lower part by applying a DC voltage to the electrodes disposed in the upper part and the lower part of the electrophoresis tank (referred to as a "separation step").

In the nanocarbon separation method in the embodiment, the nanocarbon refers to carbon materials mainly composed of carbon such as single-walled carbon nanotubes, double-walled carbon nanotubes, multi-walled carbon nanotubes, carbon nanohorns, carbon nanotwists, graphenes, and fullerenes. In the nanocarbon separation method in the embodiment, a case in which semiconducting single-walled carbon nanotubes and metallic single-walled carbon nanotubes are separated from the nanocarbon dispersion liquid 200 containing single-walled carbon nanotubes as nanocarbon will be described in detail.

It is known that single-walled carbon nanotubes can be divided into two different types, i.e., those having metallic properties and those having semiconducting properties in accordance with a diameter and a winding manner of a tube. When single-walled carbon nanotubes are synthesized using currently known manufacturing methods, mixed materials including single-walled carbon nanotubes which include semiconducting single-walled carbon nanotubes having metallic properties and semiconducting single-walled carbon nanotubes having semiconducting properties in a statistical ratio of 1:2 are obtained.

The mixed materials including single-walled carbon nanotubes are not particularly limited as long as the mixed materials include metallic single-walled carbon nanotubes and semiconducting single-walled carbon nanotubes. Furthermore, the single-walled carbon nanotubes in the embodiment may be independently single-walled carbon nanotubes or may be single-walled carbon nanotubes in which some of carbon atoms thereof are substituted with arbitrary functional groups, or single-walled carbon nanotubes in which some of carbon atoms thereof are modified by arbitrary functional groups.

In the nanocarbon separation method in the embodiment, the mixture of nanocarbons includes metallic nanocarbons and semiconducting nanocarbons.

First, in the preparation step, a nanocarbon dispersion liquid 200 in which a mixture of nanocarbons is dispersed in a dispersion medium together with a non-ionic surfactant is prepared. That is to say, a dispersion liquid in which a mixture of two or more types of nanocarbons with different specific gravities (metallic nanocarbon and semiconducting nanocarbon) is, dispersed is prepared.

Also, a solution (hereinafter referred to as an "upper layer solution") 210 forming an upper layer in the electrophoresis tank 101 is prepared.

Furthermore, a solution (hereinafter referred to as a "lower layer solution") 220 forming a lower layer in the electrophoresis tank 101 is prepared.

It is desirable to adjust the specific gravities of the nanocarbon dispersion liquid 200, the upper layer solution 210, and the lower layer solution 220 using a concentration of a surfactant added thereto. The upper layer solution 210 may be a concentration of a surfactant of 0%, that is, no surfactant.

Also, it is desirable that, among the nanocarbon dispersion liquid 200, the upper layer solution 210, and the lower layer solution 220, the upper layer solution 210 has the lowest specific gravity and the lower layer solution 220 is the highest specific gravity. Furthermore, it is desirable that the nanocarbon dispersion liquid 200 has a specific gravity between those of the upper layer solution 210 and the lower layer solution 220.

The dispersion medium is not particularly limited as long as a mixture of nanocarbons can be dispersed in the dispersion medium. Examples of the dispersion medium include water, heavy water, an organic solvent, an ionic liquid, and the like. Among these dispersion mediums, water, heavy water, or a mixed solvent of water and heavy water may be preferably used because the properties of nanocarbons do not change.

When a mixed solvent of water and heavy water is used as a dispersion medium, it is possible to adjust the specific gravities of the nanocarbon dispersion liquid 200, the upper layer solution 210, and the lower layer solution 220 using a concentration associated with a mixing ratio of the water and the heavy water. In this case, the adjustment ranges of the specific gravities are higher than those adjusted using only the concentration of a surfactant.

As non-ionic surfactants, non-ionic surfactants having a non-ionizing hydrophilic site and a hydrophobic site such as an alkyl chain may be used. Examples of such non-ionic surfactants include non-ionic surfactants having a polyethylene glycol structure represented by a polyoxyethylene alkyl ether type.

As such non-ionic surfactants, polyoxyethylene alkyl ether represented by the following Expression (1) may be appropriately used:

$$C_nH_{2n}(OCH_2CH_2)_mOH \quad (1)$$

(where, n=12 to 18 and m=10 to 100).

Examples of polyoxyethylene alkyl ether represented by the above Expression (1) include polyoxyethylene (23) lauryl ether (trade name: Brij L23 manufactured by Sigma-Aldrich Co. LLC), polyoxyethylene (20) cetyl ether (trade name: Brij C20 manufactured by Sigma-Aldrich Co. LLC), polyoxyethylene (20) stearyl ether (trade name: Brij S20 manufactured by Sigma-Aldrich Co. LLC), polyoxyethylene (20) oleyl ether (trade name: Brij O20 manufactured by Sigma-Aldrich Co. LLC), polyoxyethylene (10) oleyl ether (Brij O10 [trade name] manufactured by Sigma-Aldrich Co. LLC), polyoxyethylene (10) cetyl ether (Brij C10 [trade name] manufactured by Sigma-Aldrich Co. LLC), polyoxyethylene (10) stearyl ether (Brij S10 [trade name] manufactured by Sigma-Aldrich Co. LLC), polyoxyethylene (100) stearyl ether (trade name: Brij S100 manufactured by Sigma-Aldrich Co. LLC), and the like.

As non-ionic surfactants, polyoxyethylene sorbitan monostearate (molecular formula: $C_{64}H_{126}O_{26}$, trade name: Tween 60 manufactured by Sigma-Aldrich Co. LLC), polyoxyethylene sorbitan trioleate (molecular formula: $C_{24}H_{44}O_6$, trade name: Tween 85 manufactured by Sigma-Aldrich Co. LLC), octylphenol ethoxylate (molecular formula: $C_{14}H_{22}O(C_2H_4O)_n$, n=1 to 10, trade name: Triton X-100 manufactured by Sigma-Aldrich Co. LLC), polyoxyethylene (40) isooctyl phenyl ether (molecular formula: $C_8H_{17}C_6H_{40}(CH_2CH_{20})_{40}H$, trade name: Triton X-405 manufactured by Sigma-Aldrich Co. LLC), poloxamer (molecular formula: $C_5H_{10}O_2$, trade name: Pluronic manufactured by Sigma-Aldrich Co. LLC), polyvinyl pyrrolidone (molecular formula: $(C_6H_9NO)_n$, n=5 to 100 manufactured by Sigma-Aldrich Co. LLC), and the like can also be used.

The amount of the non-ionic surfactant in the nanocarbon dispersion liquid 200 is preferably 0.1 wt % or more and 5 wt % or less, and more preferably 0.5 wt % or more and 2 wt % or less.

If the amount of the non-ionic surfactant is 0.1 wt % or more, the pH gradient of the nanocarbon dispersion liquid 200 can be formed in the electrophoresis tank 101 using carrier-free electrophoresis. On the other hand, if the amount of the non-ionic surfactant is 5 wt % or less, the metallic nanocarbon and the semiconducting nanocarbon contained in the nanocarbon dispersion liquid 200 can be easily separated using carrier-free electrophoresis without excessively increasing the viscosity of the nanocarbon dispersion liquid 200.

The amount of the nanocarbon in the nanocarbon dispersion liquid 200 is preferably 1 µg/mL or more and 100 µg/mL or less, and more preferably 5 µg/mL or more and 40 µg/mL or less.

If the amount of the nanocarbon is within the above range, the metallic nanocarbon and the semiconducting nanocarbon contained in the nanocarbon dispersion liquid 200 can be easily separated using carrier-free electrophoresis.

A method of preparing the nanocarbon dispersion liquid 200 is not particularly limited and known methods can be used as the method. Examples of the method include a method of subjecting a liquid mixture of a mixture of nanocarbons and a dispersion medium containing a non-ionic surfactant to ultrasonic treatment to disperse the mixture of nanocarbons in the dispersion medium. An aggregated mixture of metallic nanocarbon and semiconducting nanocarbon is sufficiently separated through this ultrasonic treatment and the nanocarbon dispersion liquid 200 is obtained by uniformly dispersing the metallic nanocarbon and the semiconducting nanocarbon in the dispersion medium. Therefore, the metallic nanocarbon and the semiconducting nanocarbon are easily separated through a carrier-free electrophoresis method which will be described later. It should be noted that, it is desirable to separate and remove the metallic nanocarbon and the semiconducting nanocarbon which are not dispersed through ultrasonic treatment using ultracentrifugation.

Subsequently, in the injection step, a plurality of liquids are sequentially injected into the electrophoresis tank 101 so that the specific gravities of the liquids decrease from the bottom to the top thereof in the direction of gravitational force. That is to say, the nanocarbon dispersion liquid 200 is injected to be present between the upper layer solution 210 and the lower layer solution 220.

To be specific, the lower layer solution 220 having the highest specific gravity is put into the electrophoresis tank 101. Subsequently, the nanocarbon dispersion liquid 200 having the second highest specific gravity is put into the electrophoresis tank 101. Subsequently, the upper layer solution 210 having the lowest specific gravity is put into the electrophoresis tank 101. Thus, it is possible to form a specific gravity gradient so that the specific gravities of the liquids decrease from the bottom to the top thereof in the direction of gravitational force in the electrophoresis tank 101. The liquids may be put gently, for example, using a pipette.

Also, in the injection step, it is desirable to sequentially inject the nanocarbon dispersion liquid 200, the upper layer solution 210, and the lower layer solution 220 so that the first electrode 102 is in contact with only the upper layer solution 210 and the second electrode 103 is in contact with only the lower layer solution 220.

Furthermore, as described above, in the injection step in the embodiment, it is also possible to gently sequentially inject the upper layer solution 210, the nanocarbon dispersion liquid 200, and the lower layer solution 220, for example, using a peristaltic pump or the like via the injection/recovery port 106 provided in the bottom portion of the electrophoresis tank 101.

In the injection step, a space between the lower end of the cylindrical member 107 and the fitting member 109 is closed. Furthermore, a liquid is injected into the cylindrical member 107. The liquid to be injected may be, for example, the same liquid as the lower layer solution 220.

Subsequently, in the separation step, the metallic nanocarbon and the semiconducting nanocarbon contained in the nanocarbon dispersion liquid 200 are separated using carrier-free electrophoresis in a state in which a gap is provided between the lower end of the cylindrical member 107 and the fitting member 109 by moving the columnar member 108 downward in the height direction of the electrophoresis tank 101. It should be noted that, as described above, even when a gap is provided between the lower end of the cylindrical member 107 and the fitting member 109, it is desirable that most of the second electrode 103 be disposed in the cylindrical member 107.

In the nanocarbon dispersion liquid 200 containing the non-ionic surfactant, the metallic nanocarbon has a positive charge and the semiconducting nanocarbon has a very weak negative charge.

Therefore, when a DC voltage is applied to the first electrode 102 and the second electrode 103, in the mixture of nanocarbons contained in the nanocarbon dispersion liquid 200, the metallic nanocarbon moves toward the first electrode 102 (the negative electrode) side and the semiconducting nanocarbon moves toward the second electrode 103 (the positive electrode) side. As a result, the nanocarbon dispersion liquid 200 is separated into three phases, i.e., a dispersion liquid phase having a relatively large amount of metallic nanocarbon (hereinafter referred to as a "dispersion liquid phase A"), a dispersion liquid phase having a relatively large amount of semiconducting nanocarbon (hereinafter referred to as a "dispersion liquid phase B"), and a dispersion liquid phase formed between the dispersion liquid phase A and the dispersion liquid phase B and having a relatively small amount of metallic nanocarbon and semiconducting nanocarbon (referred to as a "dispersion liquid phase C").

In the embodiment, the dispersion liquid phase A is formed on the first electrode 102 side and the dispersion liquid phase B is formed on the second electrode 103 side.

A DC voltage applied to the first electrode 102 and the second electrode 103 is not particularly limited and is appropriately adjusted in accordance with a distance between the first electrode 102 and the second electrode 103, the amount of a mixture of nanocarbons in the nanocarbon dispersion liquid 200, and the like.

When water or heavy water is used as a dispersion medium of the nanocarbon dispersion liquid 200, a DC voltage applied to the first electrode 102 and the second electrode 103 can be an arbitrary value between greater than 0 V and 1000 V or less.

For example, when a distance between the first electrode 102 and the second electrode 103 (an inter-electrode distance) is 30 cm, the DC voltage applied to the first electrode 102 and the second electrode 103 is preferably 15 V or more and 450 V or less, and more preferably 30 V or more and 300 V or less.

If the DC voltage applied to the first electrode 102 and the second electrode 103 is 15 V or more, it is possible to form a pH gradient of the nanocarbon dispersion liquid 200 in the electrophoresis tank 101 and to separate the metallic nanocarbon and the semiconducting nanocarbon contained in the nanocarbon dispersion liquid 200. On the other hand, if the DC voltage applied to the first electrode 102 and the second electrode 103 is 450 V or less, it is possible to minimize an influence due to the electrolysis of water or heavy water.

Also, when a DC voltage has been applied to the first electrode 102 and the second electrode 103, an electric field between the first electrode 102 and the second electrode 103 is preferably 0.5 V/cm or more and 15 V/cm or less, and more preferably 1 V/cm or more and 10 V/cm or less.

If the electric field between the first electrode 102 and the second electrode 103 is 0.5 V/cm or more, it is possible to form a pH gradient of the nanocarbon dispersion liquid 200 in the electrophoresis tank 101 and to separate the metallic nanocarbon and the semiconducting nanocarbon contained in the nanocarbon dispersion liquid 200. On the other hand, if the electric field between the first electrode 102 and the second electrode 103 is 15 V/cm or less, it is possible to minimize an influence due to the electrolysis of water or heavy water.

When a DC voltage is applied using the first electrode 102 as a negative electrode and the second electrode 103 as a positive electrode, water or heavy water is electrolyzed to generate hydrogen (deuterium) at the first electrode 102 and generate oxygen at the second electrode 103. When oxygen generated at the second electrode 103 moves as air bubbles to the upper part of the electrophoresis tank 101, the nanocarbon dispersion liquid 200 being separated may be disturbed, resulting in the occurrence of convection in some cases.

In the separation apparatus 100 in the embodiment, a voltage of carrier-free electrophoresis is applied in a state in which a gap is provided between the lower end of the cylindrical member 107 and the fitting member 109. Oxygen generated through the electrolysis at the second electrode 103 moves upward in the cylindrical member 107 and goes outside of the electrophoresis tank 101. In the nanocarbon separation method in the embodiment, the separation of the metallic nanocarbon and the semiconducting nanocarbon contained in the nanocarbon dispersion liquid 200 is mainly performed in the electrophoresis tank 101 and the cylindrical member 107. Therefore, according to the nanocarbon separation method in the embodiment, by moving the oxygen generated at the second electrode 103 upward as air bubbles, it is possible to prevent the nanocarbon dispersion liquid 200 being separated from being disturbed. Accordingly, the disturbance due to the air bubbles generated through the electrolysis of water or heavy water is smaller than that when the separation apparatus 1 used in the first embodiment is used, the separation is stable, and the accuracy of the separation is improved. Furthermore, it becomes possible to apply a higher voltage and it is possible to cause the separation to be performed more quickly and stably.

Subsequently, the dispersion liquid phase A and the dispersion liquid phase B which have been separated are recovered (fractionated).

A method of recovering is not particularly limited and may be any method as long as the dispersion liquid phase A and the dispersion liquid phase B do not diffuse and mix into each other due to the method.

Examples of the method of recovering include a method of stopping applying a DC voltage to the first electrode 102 and the second electrode 103, opening the rotary cock provided in the injection/recovery port 106, slowly discharging the dispersion liquid with the dispersion liquid phase A from the bottom of the electrophoresis tank 101 using a peristaltic pump or the like to recover the dispersion liquid, and subsequently slowly discharging the dispersion liquid with the dispersion liquid phase B from the bottom of the electrophoresis tank 101 to recover the dispersion liquid.

It is possible to obtain metallic nanocarbon and semiconducting nanocarbon having the higher purity by repeatedly performing an operation of accommodating the recovered dispersion liquids in the electrophoresis tank 101 again and separating the metallic nanocarbon and the semiconducting nanocarbon contained in the nanocarbon dispersion liquid 200 through the carrier-free electrophoresis method in the same manner as described above.

The separation efficiency of the recovered dispersion liquids can be evaluated using a method such as a microscopic Raman spectroscopic analysis (a change in Raman spectrum shape in a Radial Breathing Mode (RBM) region and a change in Raman spectrum shape in a Breit-Wigner-Fano (BWF) region), ultraviolet visible near-infrared absorption spectrophotometry (a change in peak shape in an absorption spectrum), and the like. Furthermore, it is possible to evaluate the separation efficiency of the dispersion liquids even if the evaluation of the electrical properties of the nanocarbon is performed. For example, it is possible to evaluate the separation efficiency of the dispersion liquids by preparing a field effect transistor and measuring the transistor characteristics thereof.

According to the nanocarbon separation method in the embodiment, the amount of the metallic nanocarbon increases in the vicinity of the first electrode 102 that is the negative electrode and the amount of the semiconducting nanocarbon increases in the vicinity of the second electrode 103 that is the positive electrode. Thus, it is possible to stably separate the metallic nanocarbon and the semiconducting nanocarbon. As a result, it is possible to obtain metallic nanocarbon and semiconducting nanocarbon with high purity. Furthermore, according to the nanocarbon separation method in the embodiment, the nanocarbon dispersion liquid 200 contains the non-ionic surfactant. Thus, in the carrier-free electrophoresis, an amount of current flowing through the nanocarbon dispersion liquid 200 can be reduced and an amount of heat to be generated in the nanocarbon dispersion liquid 200 can be minimized.

It should be noted that, although a case in which the mixture of nanocarbons is separated into the metallic nanocarbon and the semiconducting nanocarbon has been provided as an exemplary example of the nanocarbon separation method in the embodiment, the nanocarbon separation method in the embodiment is not limited thereto. The nanocarbon separation method in the embodiment may be performed, for example, as a purification method of nanocarbon in which the mixture is separated into the metallic nanocarbon and the semiconducting nanocarbon in the electrophoresis tank 101 and then only nanocarbon having desired properties is recovered.

Also, when the first electrode 102 is a positive electrode and the second electrode 103 is a negative electrode, hydrogen generated through the electrolysis at the second electrode 103 moves upward in the cylindrical member 107 and goes outside of the electrophoresis tank 101. Thus, it is possible to prevent the occurrence of convection of the nanocarbon dispersion liquid 200 being separated as air bubbles of hydrogen generated at the second electrode 103.

Although the embodiments which can be applied to a case in which the mixture of nanocarbons is separated into the metallic nanocarbon and the semiconducting nanocarbon have been described above, the present invention can be applied even when a mixture of multi-walled carbon nanotubes, a mixture of double-walled carbon nanotubes, a mixture of graphenes, and the like is separated.

WORKING EXAMPLE

Although the present invention will be described in more detail below through working examples, the present invention is not limited the following working examples.

Working Example 1

Figure 7A:
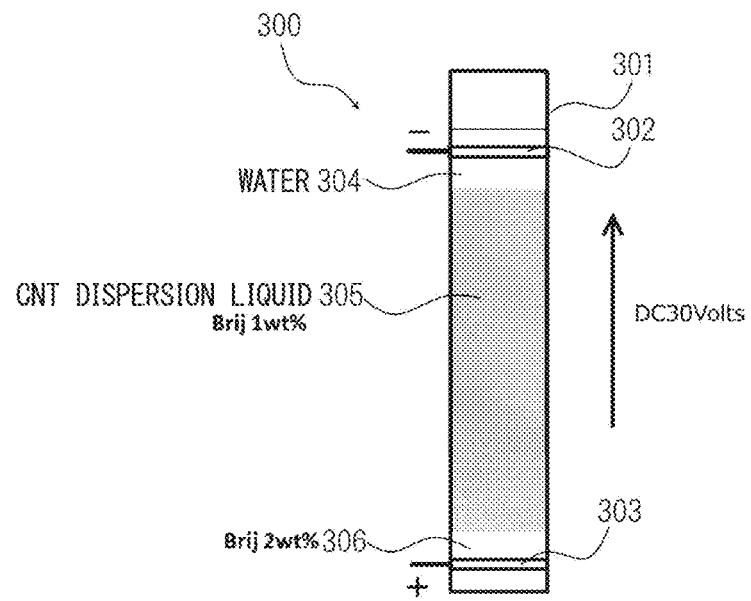
FIG. 7A is a schematic diagram showing one example of electrophoresis conditions according to Working Example 1.

FIG. 7A is a schematic diagram showing one example of the electrophoresis conditions shown in this embodiment. The following description will be provided with reference to FIG. 7A.
(1) Preparation of Liquids for Separation As a dispersion medium, an aqueous solution in which 1 wt % of Brij S100 (hereinafter referred to as a "surfactant") that was a non-ionic surfactant was dissolved in water was prepared. A single-walled carbon nanotube mixture (enhanced direction injection pyrolytic synthesis (eDIPS) single-walled carbon nanotube) was introduced into this dispersion medium. The introduced liquid was subjected to ultrasonic dispersion treatment using a horn type ultrasonic crusher (output: about 300 W; during 30 minutes). After that, the introduced liquid was subjected to an ultracentrifugation operation and a supernatant that is 50% of the introduced liquid was obtained as a dispersion liquid (hereinafter referred to as a "CNT dispersion liquid").

Also, an aqueous solution in which 2 wt % of Brij S100 that was a non-ionic surfactant was dissolved in water (hereinafter referred to as a "2 wt % Brij aqueous solution") and water were prepared.

In the case of specific gravities of liquids, the 2 wt % Brij aqueous solution was the highest, the CNT dispersion liquid was the second highest, and water was the lowest.
(2) Injection of Liquids The prepared liquids were injected into an electrophoresis tank 301 of a separation apparatus 300 shown in FIG. 7A. First, the 2 wt % Brij aqueous solution was put into the electrophoresis tank 301. A 2 wt % Brij layer 306 was formed using the put-in 2 wt % Brij aqueous solution. Subsequently, the CNT dispersion liquid was gently put into the electrophoresis tank 301 of the separation apparatus 300 so that a CNT dispersion liquid layer 305 was laminated above the 2 wt % Brij layer 306. Finally, water was gently put into the electrophoresis tank 301 of the separation apparatus 300 so that a water layer 304 was laminated above the CNT dispersion liquid layer 305. As described above, a specific gravity gradient decreasing from the bottom to the top thereof in the direction of gravitational force was formed in the liquids in the electrophoresis tank 301.
(3) Separation Operation A DC voltage (30 V) was applied between a lower electrode 303 (a positive electrode) and an upper electrode 302 (a negative electrode) of the separation apparatus 300.

Figure 8A:
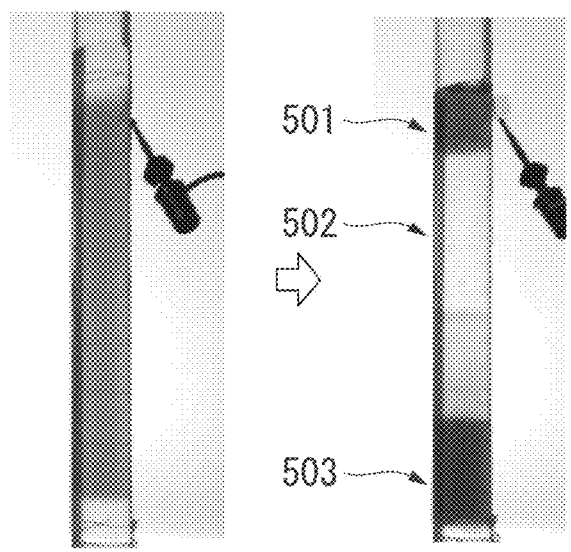
FIG. 8A is photographs showing a sample movement state before and after electrophoresis in an example of FIG. 7A.
Figure 8B:
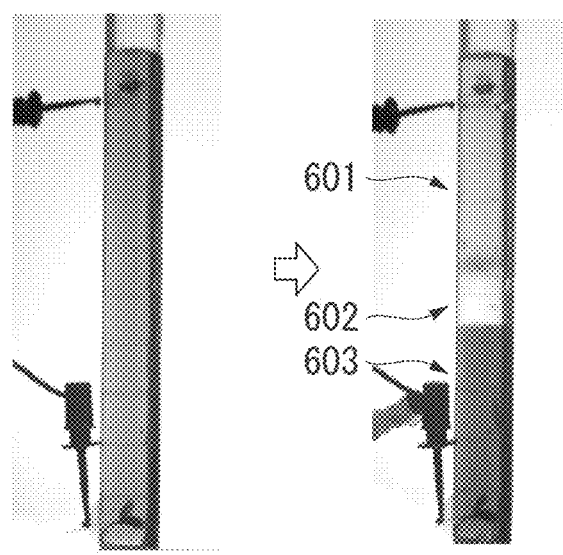
FIG. 8B is photographs showing a sample movement state before and after electrophoresis in an example of FIG. 7B.

After the voltage application was completed, it was confirmed that the layers in the electrophoresis tank 301 were formed. FIGS. 8A and 8B show photographs of the electrophoresis tank 101 before and after the separation operation. A final state was a state in which three layers, i.e., a region (501 or 601) containing a large amount of metallic single-walled carbon nanotubes, a transparent region (502 or 602), and a region (503 or 603) containing a large amount of semiconducting single-walled carbon nanotubes were formed.

After the voltage application was completed, the liquid were recovered from an upper part of the electrophoresis tank 301 so that 7 fractions were obtained per about 1 mL. The fractions were #1, #2, . . . , and #7 from the negative electrode side (the upper part) of the electrophoresis tank 301. Refractive indexes which will be described later were measured for the obtained fractions.

Comparative Example of Working Example 1

Figure 7B:
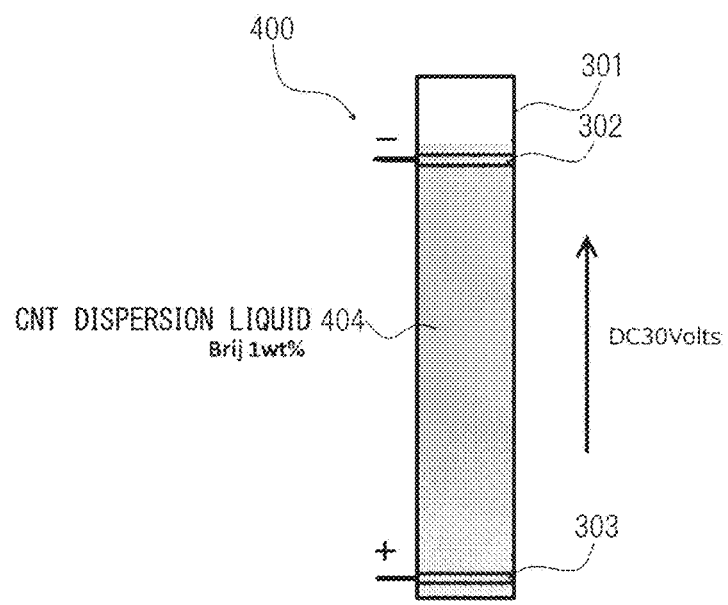
FIG. 7B is a schematic diagram showing electrophoresis conditions compared to those of FIG. 7A.

FIG. 7B is a schematic diagram showing electrophoresis conditions compared to those of FIG. 7A. Description will be provided below with reference to FIG. 7A.

The same operation as in Working Example 1 was performed except that only the same CNT dispersion liquid as in Working Example 1 was injected into an electrophoresis tank 301 of a separation apparatus 400 shown in FIG. 7B.

With regard to Working Example 1 and comparative example thereof, it was confirmed that the liquids in the electrophoresis tank 301 changed due to the voltage application. FIGS. 8A and 8B show photographs of the separation apparatus before and after the separation operation. FIG. 8A is the photographs of the electrophoresis tank 301 before and after the separation operation in Working Example 1 and FIG. 8B is the photographs of the electrophoresis tank 301 before and after the separation operation in the comparative example of Working Example 1.

Also in the case of all of FIGS. 8A and 8B, each final state was a state in which three layers, i.e., a region (501 or 601) containing a large amount of metallic single-walled carbon nanotubes, a transparent region (502 or 602), and a region (503 or 603) containing a large amount of semiconducting single-walled carbon nanotubes were formed.

Referring to FIGS. 8A and 8B, in Working Example 1, the region (501) containing a large amount of metallic single-walled carbon nanotubes and the region (503) containing a large amount of semiconducting single-walled carbon nanotubes were formed closer to the vicinity of the upper electrode 302 (the negative electrode) and the lower electrode 303 (the positive electrode) than in the comparative example. Furthermore, each of the concentrations thereof was also higher.

The CNT dispersion liquid (pristine), the liquid (semicon) recovered on the positive electrode side, and the liquid (metal) recovered on the negative electrode side were subjected to absorbance spectrum analysis and microscopic Raman spectrum analysis. From the analysis results, the separation tendency of the metallic type/semiconductor type was evaluated for Working Example 1 and the comparative example thereof.

Figure 9A:
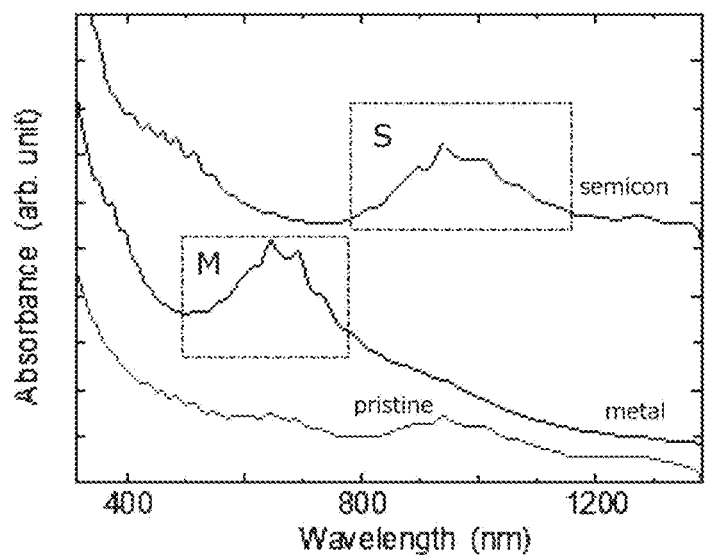
FIG. 9A is an absorption spectrum showing samples after separation in the example of FIG. 7A.
Figure 9B:
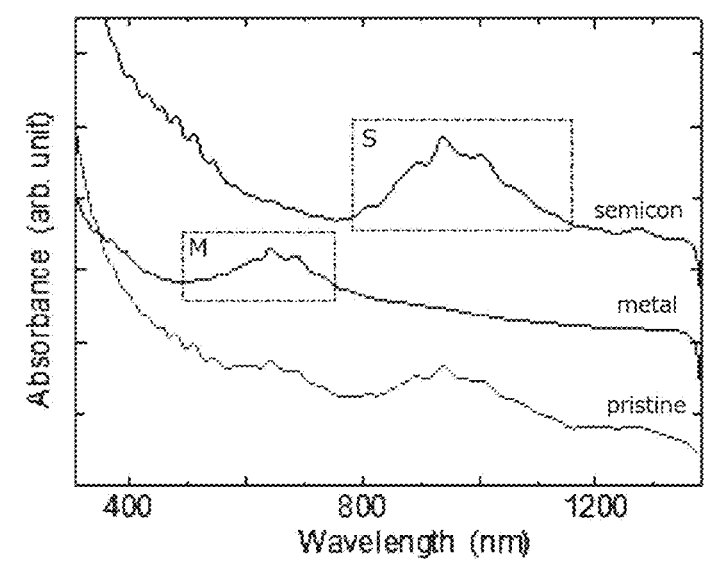
FIG. 9B is an absorption spectrum showing samples after separation in the example of FIG. 7B.

FIG. 9A (Working Example 1) and FIG. 9B (comparative example of Working Example 1) show the results of the absorption spectrum. In FIGS. 9A and 9B, reference symbol S denotes an absorption peak derived from the semiconducting single-walled carbon nanotube and reference symbol M denotes an absorption peak derived from the metallic single-walled carbon nanotube. From the areas in the peaks derived from semiconducting and metallic single-walled carbon nanotubes, the percentages of amounts of the semiconducting and metallic single-walled carbon nanotubes can be calculated. Referring to FIGS. 9A and 9B, it could be seen that the separation of Working Example 1 was possible with higher purity than that of Comparative Example 1.

Figure 10A:
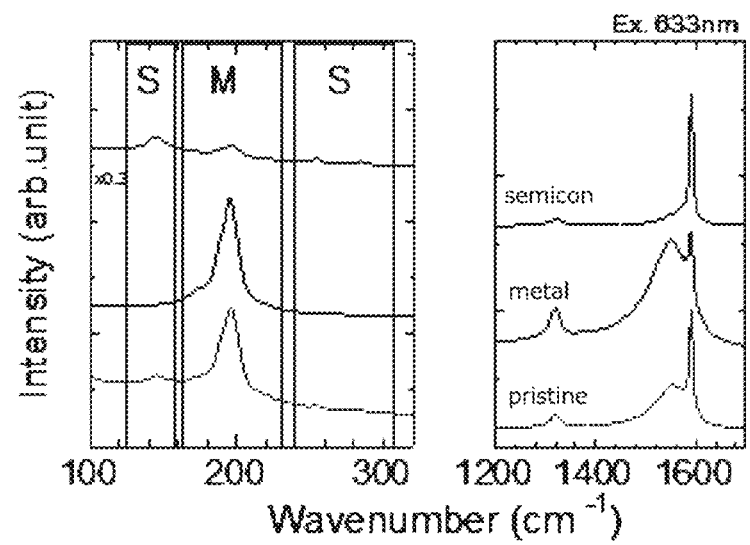
FIG. 10A is RBM region Raman spectrum of samples after separation in the example of FIG. 7A.
Figure 10B:
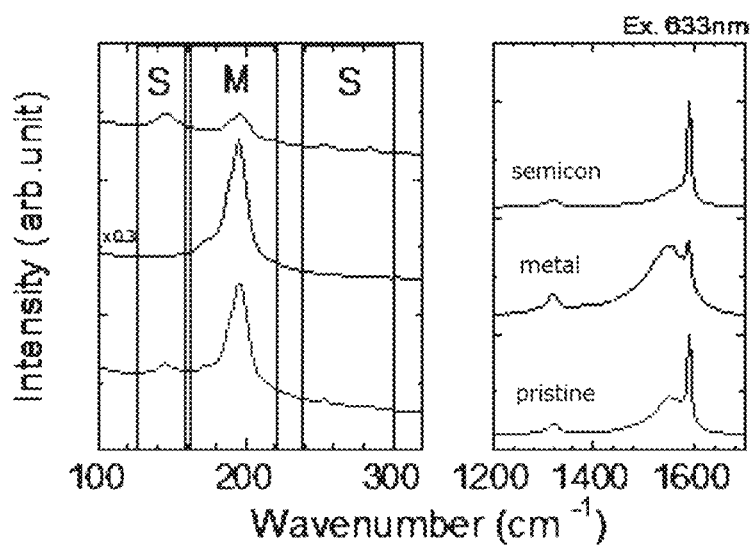
FIG. 10B is an RBM region Raman spectrum of samples after separation in the example of FIG. 7B.

FIG. 10A (Working Example 1) and FIG. 10B (comparative example of Working Example 1) show the results of Raman spectrum.

In FIGS. 10A and 10B, a left graph represents the result in the range of wave number of 100 to 300 $cm^{-1}$ and the right graph represents the result in the range of wave number of 1200 to 1680 $cm^{-1}$. Light of 633 nm was used as excitation light.

The Raman spectrum of the RBM region is a mode in which the diameter of a nanotube oscillates and appears in a low wave number region of 100 to 300 $cm^{-1}$.

The Raman spectrum of a G-band is observed around 1590 $cm^{-1}$ and is a spectrum commonly appearing in a material such as graphite. In the case of graphite, the Raman spectrum of the G-band is observed around 1585 $cm^{-1}$, but in the case of carbon nanotubes, the G-band splits into two parts and thus splits into G+ and G−. Therefore, if the G-band appears to have two peaks, it can be determined that there is a nanotube. Furthermore, in the case of metallic nanotubes, the vibration frequency of G− is largely deviated to 1550 $cm^{-1}$ as compared to semiconducting nanotubes.

The Raman spectrum of a D-band is observed around 1350 $cm^{-1}$ and is a spectrum attributed to a defect.

Therefore, from the left graphs of FIGS. 10A and 10B, the Raman spectrum of the RBM region can be read, and from the right graphs of FIGS. 10A and 10B, the Raman spectrum of the G-band and the Raman spectrum of the D-band can be read.

From FIG. 10A (Working Example 1) and FIG. 10B (comparative example of Working Example 1), it could be seen that all of the peaks on the negative electrode side (metal) and the positive electrode side (semicon) in Working Example 1 were higher than in the comparative example. This indicates that the metallic single-walled carbon nanotubes and the semiconducting single-walled carbon nanotubes in Working Example 1 can be separated to higher purity than in the comparative example.

In the final state of the separation operation, the recovery was performed to have 7 fractions per about 1 mL from the upper part of the electrophoresis tank 301. The fractions were #1, #2, . . . , and #7 from the negative electrode side (the upper part) of the electrophoresis tank 301.

Refractive index distributions and migration currents for the samples after separation (the fractions) in Working Example 1 and the comparative example thereof were evaluated.

Figure 11:
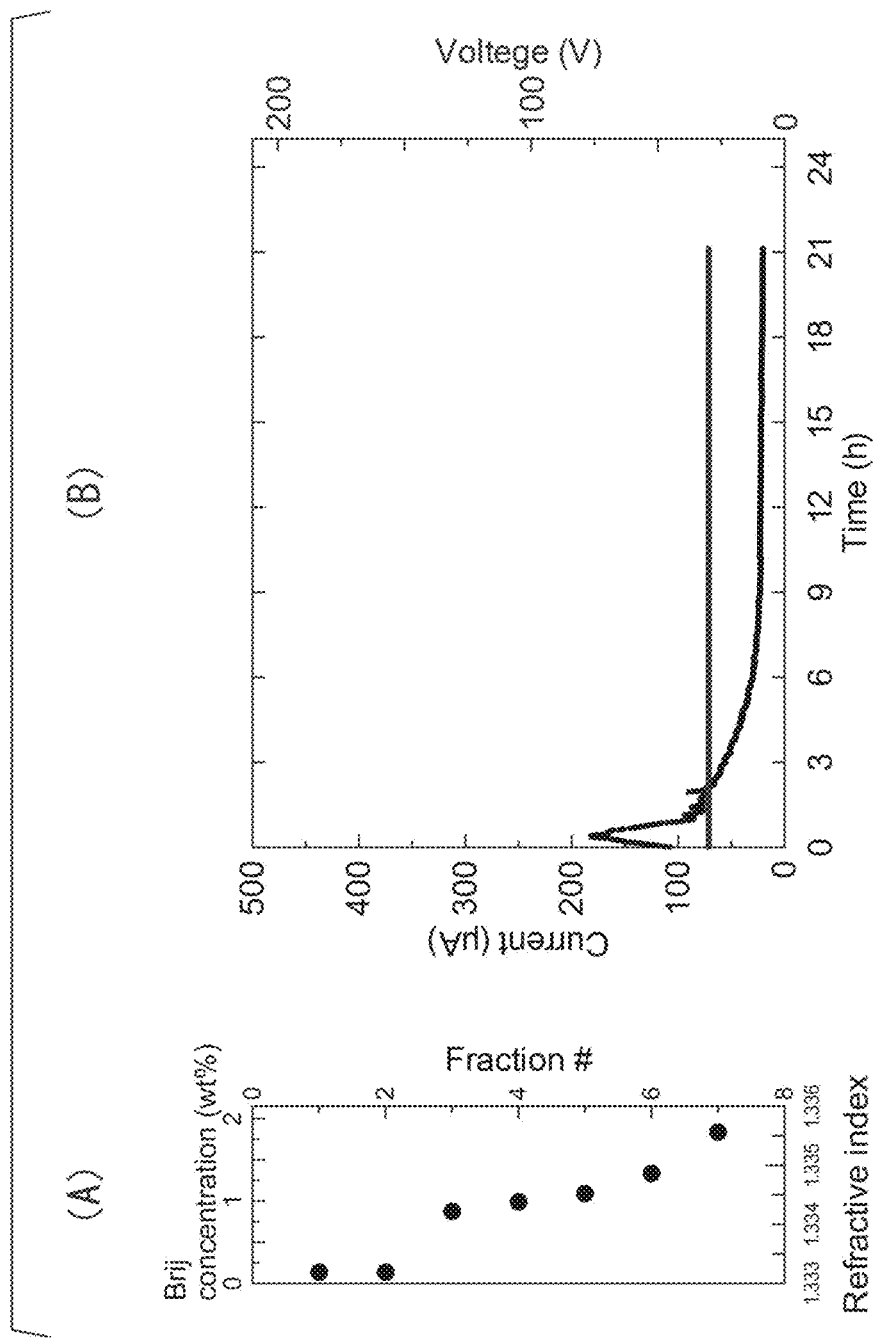
FIG. 11 is a graph showing samples after separation in the example of FIG. 7A, (A) of FIG. 11 shows a refractive index distribution, and (B) of FIG. 11 shows a migration current and an applied voltage.

(A) and (B) of FIG. 11 are graphs showing a refractive index distribution and a migration current of the samples after separation in Working Example 1 in order.

Figure 12:
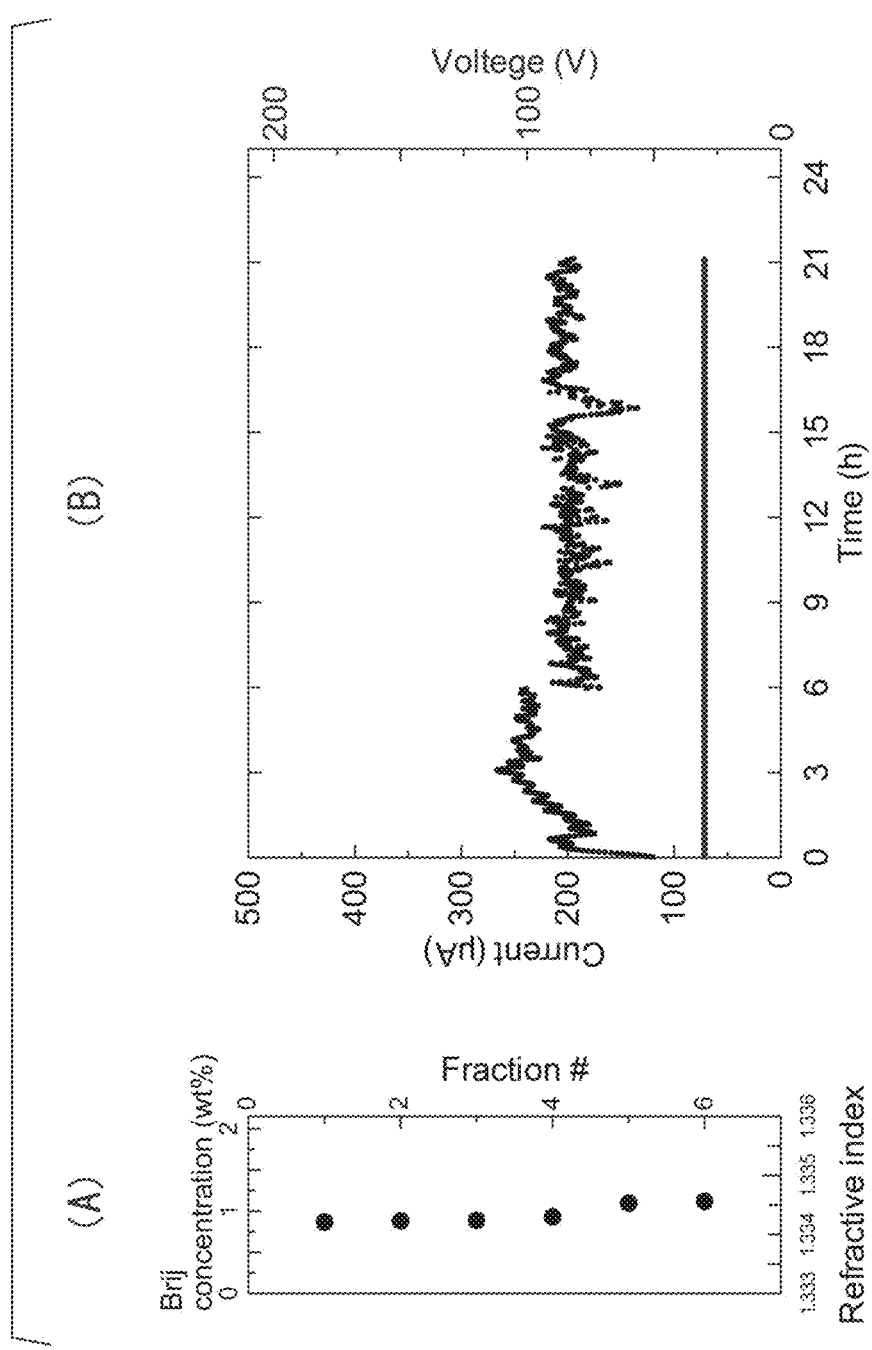
FIG. 12 is a graph showing samples after separation in the example of FIG. 7B, (A) of FIG. 12 shows a refractive index distribution, and (B) of FIG. 12 shows a migration current and an applied voltage.

(A) and (B) of FIG. 12 are graphs showing a refractive index distribution and a migration current of the samples after separation in the comparative example of Working Example 1 in order.

Referring to (A) of FIG. 11, in Working Example 1, a concentration gradient from 0 wt % to 2 wt % is acknowledged for a concentration of a surfactant indexed from a refractive index from fraction #1 to fraction #7. On the other hand, referring to (A) of FIG. 12, in the comparative example, substantially no concentration gradient is acknowledged.

As described above, in Working Example 1, the convection is minimized and the metallic single-walled carbon nanotubes and the semiconducting single-walled carbon nanotubes are stably separated. On the other hand, it is inferred that, in the comparative example, the convection occurs, the dispersion liquid is stirred as a whole, and the metallic single-walled carbon nanotubes and semiconducting single-walled carbon nanotubes are not stably separated. That is to say, when the metallic single-walled carbon nanotubes and the semiconducting single-walled carbon nanotubes are not stably separated (comparative example), a concentration gradient of a surfactant effective for separation is regarded as not being formed.

Also, it can be seen from (B) of FIG. 11 that, in Working Example 1, the migration current stably and gradually decreases with the passage of time. On the other hand, referring to (B) of FIG. 12, in the comparative example, a current value of the migration current is high and unstable compared to Working Example 1 [(B) of FIG. 11]. From this, it is inferred that, in Working Example 1, the convection in the electrophoresis tank 301 is minimized compared to the comparative example.

Working Example 2

(1) Preparation of Liquids for Separation

As a dispersion medium, an aqueous solution in which 0.25 wt % of a non-ionic surfactant was dissolved in water was prepared. A single-walled carbon nanotube mixture (eDIPS single-walled carbon nanotube) was dispersed in this dispersion medium. The dispersed liquid was subjected to ultrasonic dispersion treatment using a horn type ultrasonic crusher (output: about 300 W; during 30 minutes). After that, the dispersed liquid was subjected to a ultracentrifugation operation and a supernatant that is 50% of the dispersion liquid was obtained as a dispersion liquid (hereinafter referred to as a "0.25 wt % Brij CNT dispersion liquid").

Similarly, a dispersion liquid in which a single-walled carbon nanotube mixture was dispersed in a dispersion medium in which 1.5 wt % of a surfactant was dissolved in water (hereinafter referred to as a "1.5 wt % Brij CNT dispersion liquid") was prepared. The specific gravity of the 1.5 wt % Brij CNT dispersion liquid is higher than that of the 0.25 wt % Brij CNT dispersion liquid.

(2) Injection of Dispersion Liquids

Figure 13A:
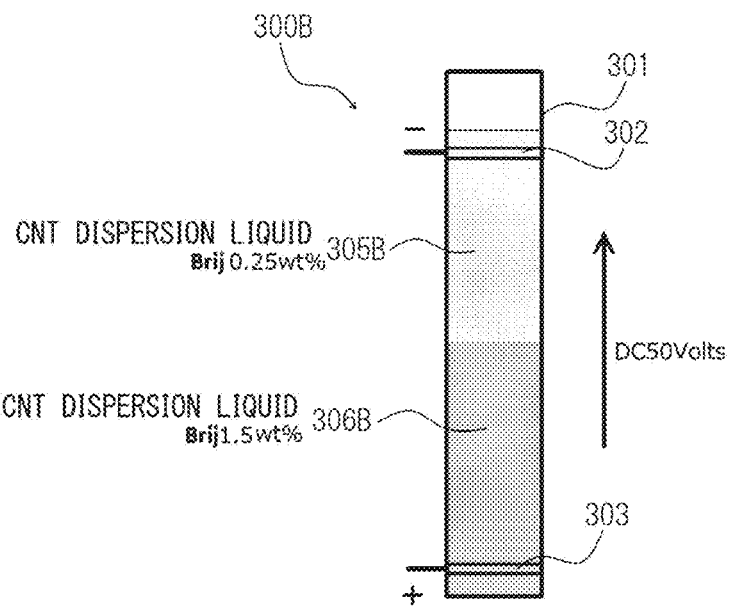
FIG. 13A is a schematic diagram showing another example of electrophoresis conditions according to Working Example 2.

The prepared liquids were injected into an electrophoresis tank 301 of a separation apparatus 300B shown in FIG. 13A. First, the 1.5 wt % Brij CNT dispersion liquid was put into the electrophoresis tank 301. A 1.5 wt % Brij CNT dispersion liquid layer 306B was formed using the put-in 1.5 wt % Brij CNT dispersion liquid. Subsequently, the 0.25 wt % Brij CNT dispersion liquid was gently put into the electrophoresis tank 301 of the separation apparatus 300B so that a 0.25 wt % Brij CNT dispersion liquid layer 305B was laminated above the 1.5 wt % Brij CNT dispersion liquid layer 306B. As described above, a specific gravity gradient decreasing from the bottom to the top thereof in the direction of gravitational force was formed in the liquids in the electrophoresis tank 301.

(3) Separation Operation

A DC voltage (50 V) was applied between a lower electrode 303 (a positive electrode) of the separation apparatus 300B and an upper electrode 302 (a negative electrode) of the separation apparatus 300B. Similarly, also in a separation apparatus 400B, a DC voltage (50 V) was applied.

Comparative Example of Working Example 2

Figure 13B:
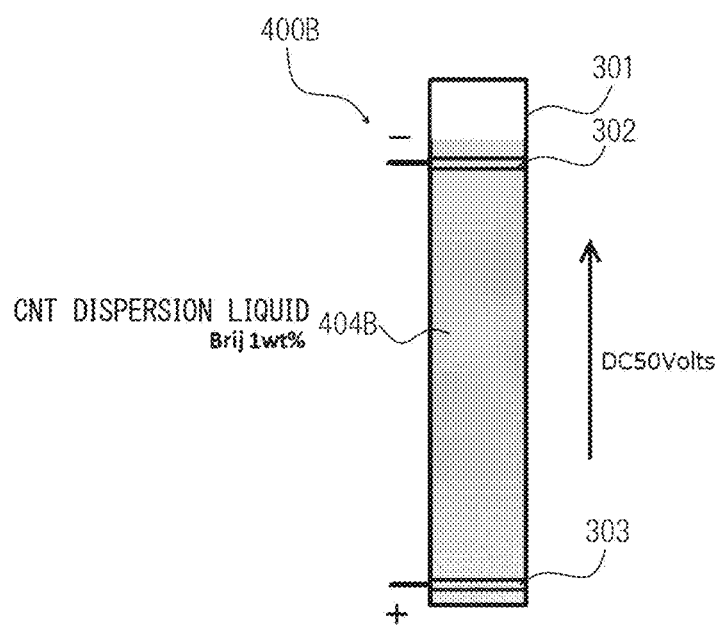
FIG. 13B is a schematic diagram showing electrophoresis conditions compared to those of FIG. 13A.

As a dispersion medium, an aqueous solution in which 1 wt % of a surfactant was dissolved in water was prepared. A dispersion liquid in which a single-walled carbon nanotube mixture was dispersed in the prepared dispersion medium (hereinafter referred to as a "1 wt % Brij CNT dispersion liquid") was prepared. As shown in FIG. 13B, only 1 wt % Brij CNT dispersion liquid was injected into the electrophoresis tank 301. The other conditions were the same as in Working Example 2.

Figure 14A:
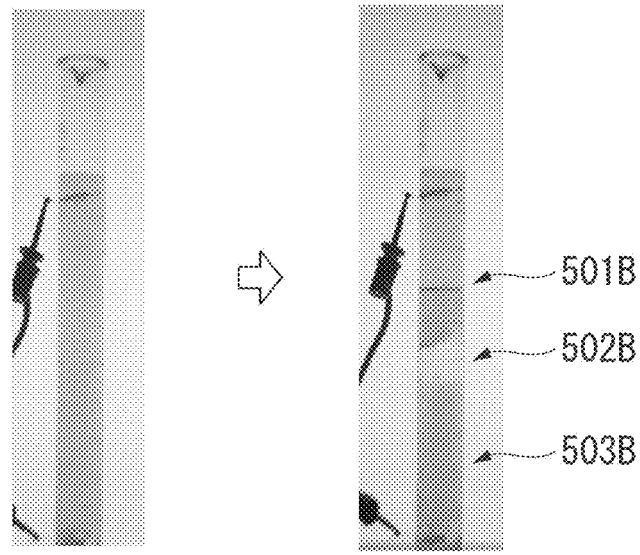
FIG. 14A is a photograph showing a sample movement state before and after electrophoresis in an example of FIG. 13A.
Figure 14B:
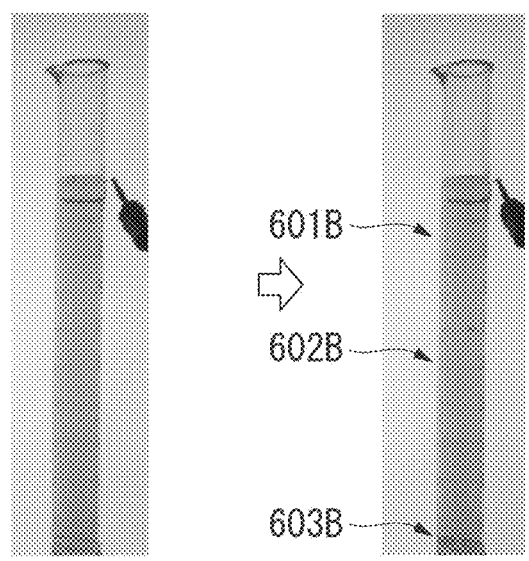
FIG. 14B is a photograph showing a sample movement state before and after electrophoresis in an example of FIG. 13B.

In Working Example 2 and the comparative example thereof, the changes in the liquids in the electrophoresis tank 301 due to the voltage application were confirmed. FIG. 14A shows photographs of the separation apparatus before and after the separation operation of Working Example 2. FIG. 14B shows photographs of the separation apparatus before and after the separation operation of the comparative example of Working Example 2. The final state of the separation operation was a state in which three layers, i.e., a region (501B or 601B) containing a large amount of metallic single-walled carbon nanotubes, a transparent region (502B or 602B), and a region (503B or 603B) containing a large amount of semiconducting single-walled carbon nanotubes were formed by the liquids in the electrophoresis tank 301.

Referring to FIGS. 14A and 14B, in Working Example 2, the region (501B) containing a large amount of metallic single-walled carbon nanotubes and the region (503B) containing a large amount of semiconducting single-walled carbon nanotubes were formed closer to the upper electrode 302 (the negative electrode) side and the lower electrode 303 (the positive electrode) side than in the comparative example. In addition, it was seen that each of the concentrations thereof was also higher.

In the final state of the separation operation, the recovery was performed to have 10 fractions per about 1 mL from the upper part of the electrophoresis tank 301. The fractions were #1, #2, . . . , and #10 from the negative electrode side (the upper part) of the electrophoresis tank 301.

Refractive index distributions and migration currents for the samples after separation (the fractions) in Working Example 2 and the comparative example thereof were evaluated.

Figure 15:
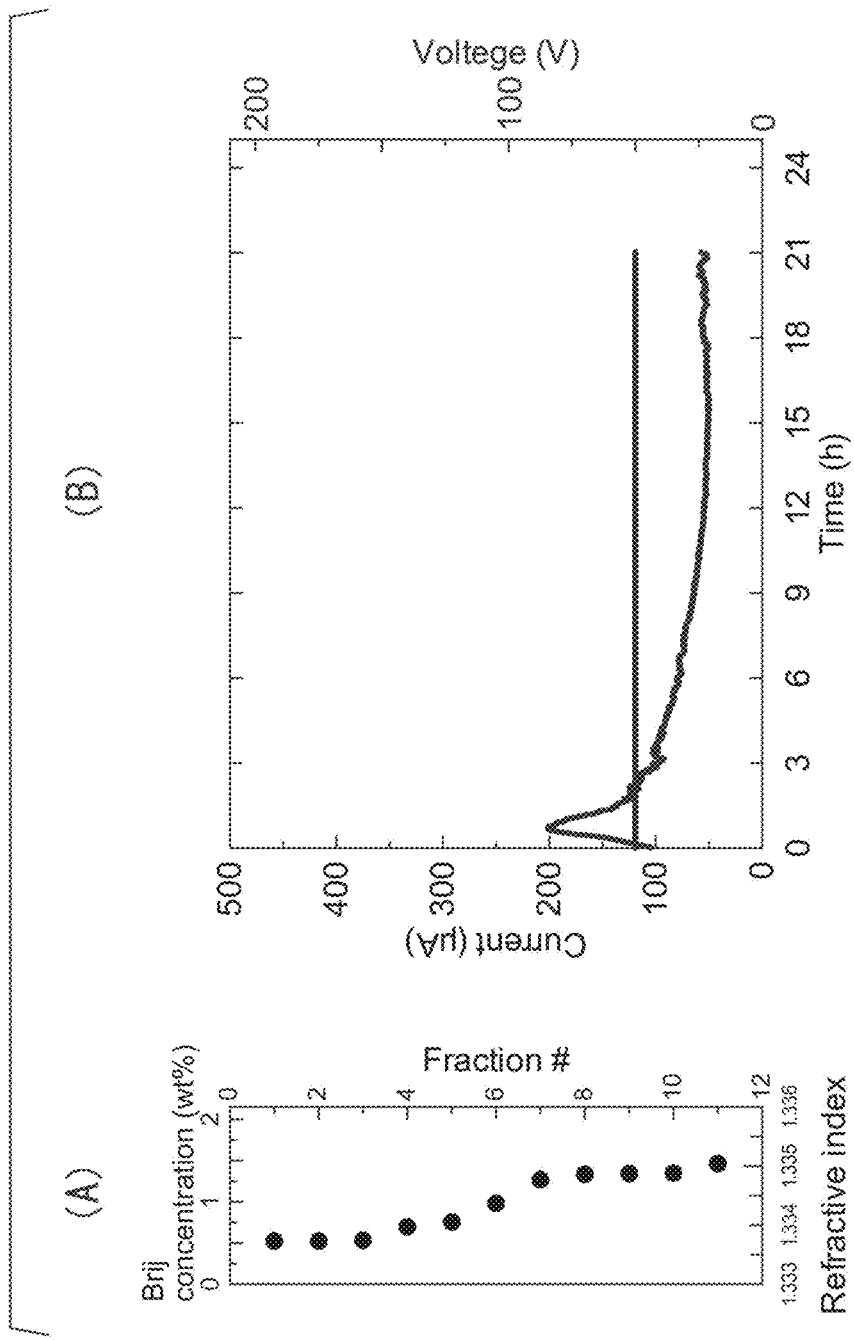
FIG. 15 is a graph showing samples after separation in the example of FIG. 13A, (A) of FIG. 15 shows a refractive index distribution, and (B) of FIG. 15 shows a migration current and an applied voltage.

(A) and (B) of FIG. 15 are graphs showing a refractive index distribution and a migration current of the samples after separation in Working Example 2 in order.

Figure 16:
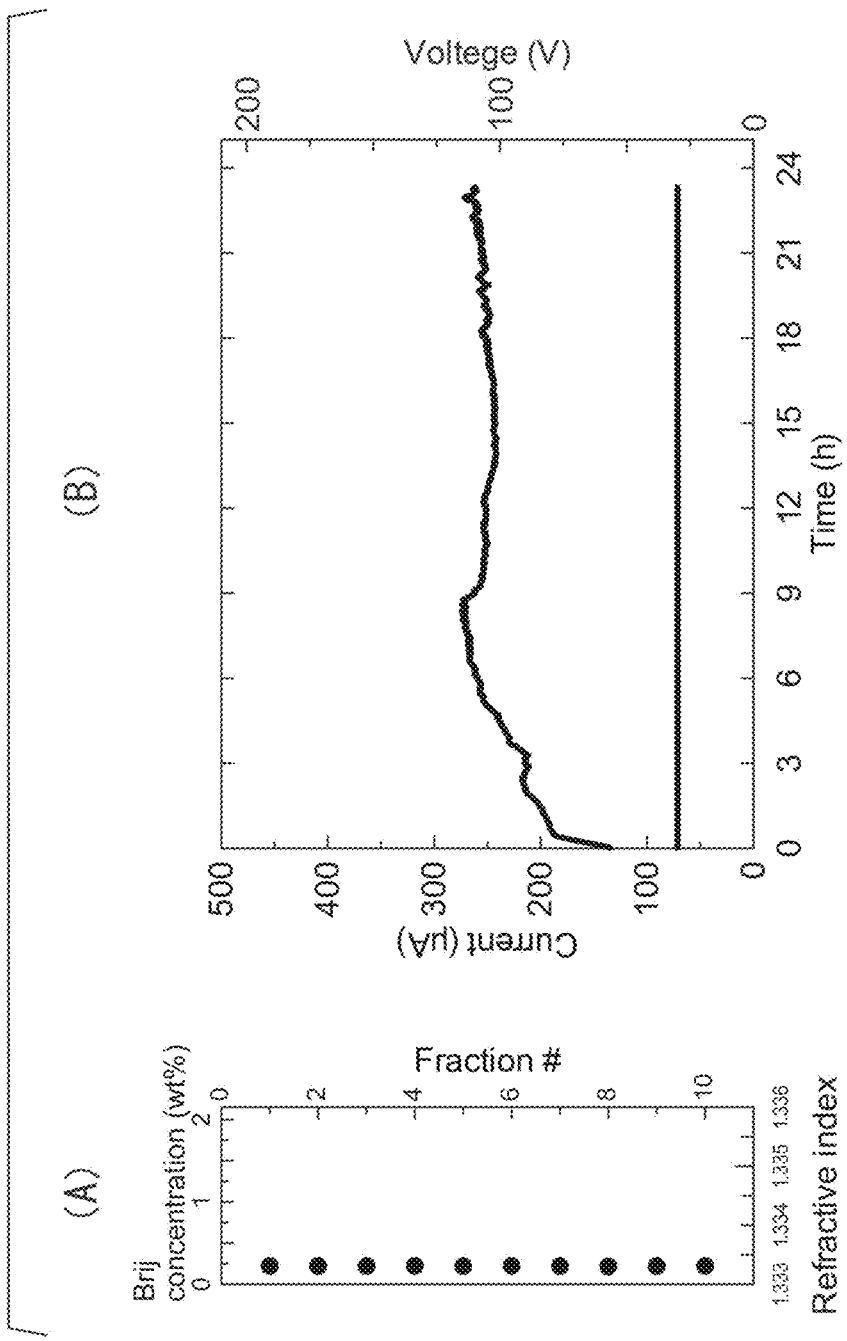
FIG. 16 is a graph showing samples after separation in the example of FIG. 13B, (A) of FIG. 16 shows a refractive index distribution, and (B) of FIG. 16 shows a migration current and an applied voltage.

(A) and (B) of FIG. 16 are graphs showing a refractive index distribution and a migration current of the samples after separation in the comparative example of Working Example 2 in order.

Referring to (A) of FIG. 15, in Working Example 2, a concentration gradient from 0.5 wt % to 1.5 wt % is acknowledged for a concentration of a surfactant indexed from a refractive index from fraction #1 to fraction #10. On the other hand, referring to (A) of FIG. 16, in the comparative example, substantially no concentration gradient is acknowledged.

As described above, it is inferred that, in Working Example 2, the convection is minimized and the metallic single-walled carbon nanotubes and the semiconducting single-walled carbon nanotubes are relatively and stably separated.

Also, it can be seen from (B) of FIG. 15 that, in Working Example 2, the migration current stably and gradually decreases with the passage of time. On the other hand, referring to (B) of FIG. 16, in the comparative example, a current value of the migration current is high and unstable compared to Working Example 2 and a gradual decrease is not acknowledged. From this, it is inferred that, in Working Example 2, the convection in the electrophoresis tank 301 is minimized compared to the comparative example.

Working Example 3

(1) Preparation of Liquid for Separation

As a dispersion medium, an aqueous solution in which 1 wt % of a surfactant was dissolved in water was prepared. A dispersion liquid in which a single-walled carbon nanotube mixture in which a diameter is 1.3 nm was dispersed in the prepared dispersion liquid was prepared.

(2) Injection of Liquid

As a separation apparatus, a separation apparatus 1C formed in a U shape shown in FIG. 5 and having a U-shaped structure having both ends opened upward was used. The liquids were injected into the electrophoresis tank 10A of the separation apparatus 1C. First, water was put in through the opening portion 10Ab of the electrophoresis tank 10A. Thus, water was filled from the electrode 30 to the opening portion 10Ab. Subsequently, the dispersion liquids prepared in the above (1) were put to the bottom portion of the electrophoresis tank 10A through the opening portion 10Aa of the electrophoresis tank 10A using a pipette. Furthermore, water was gently injected through the opening portion 10Aa of the electrophoresis tank 10A and water was laminated above the dispersion liquids.

(3) Separation Operation

Figure 17:
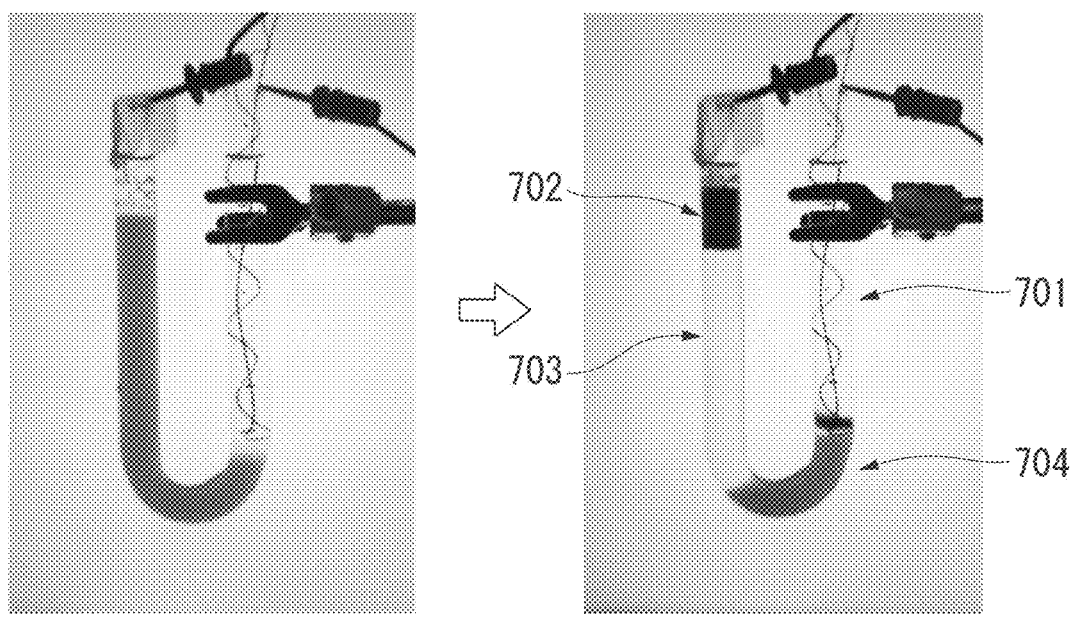
FIG. 17 is a photograph showing a sample movement state before and after electrophoresis in another example of electrophoresis conditions according to Working Example 3.

A DC voltage was applied between the electrode 30 (the positive electrode) and the electrode 20 (the negative electrode) in the separation apparatus 1C. After that, it was confirmed that the layers in the electrophoresis tank 10A was formed. FIG. 17 shows photographs of the electrophoresis tank 10A before and after the separation operation. In the final state of the separation operation, a region 701 of water was formed from the electrode 30 (the positive electrode) to the vicinity of the bottom surface, a region 702 containing a large amount of metallic single-walled carbon nanotubes was formed near a portion just below the electrode 20 (the negative electrode), a transparent region 703 was formed to the vicinity of the bottom surface in the lower part thereof, and a region 704 containing a large amount of semiconducting single-walled carbon nanotubes was formed near the bottom surface. It was confirmed that metallic single-walled carbon nanotubes and semiconducting single-walled carbon nanotubes were separated in the region 702 and the region 704.

Working Example 4

(1) Preparation of Liquids for Separation

A dispersion liquid in which a single-walled carbon nanotube mixture was dispersed in an aqueous solution in which 0.5 wt % of a surfactant was dissolved was prepared (hereinafter referred to as a "0.5 wt % Brij CNT dispersion liquid"). Subsequently, an aqueous solution in which 2 wt % of a non-ionic surfactant was dissolved in water (hereinafter referred to as a "2 wt % Brij aqueous solution") and water were prepared.

(2) Injection of Liquids

Figure 18A:
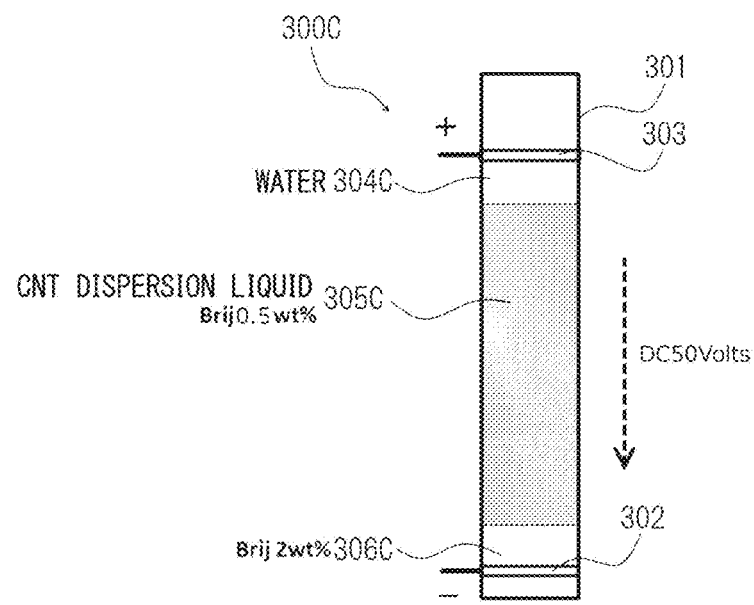
FIG. 18A is a schematic diagram showing another example of electrophoresis conditions according to Working Example 4.

The prepared liquids were injected into the electrophoresis tank 301 of the separation apparatus 300C shown in FIG. 18A. First, the 2 wt % Brij aqueous solution was put into the electrophoresis tank 301. Thus, the 2 wt % Brij layer 306C having a high specific gravity was formed in the electrophoresis tank 301. Subsequently, the 0.5 wt % Brij CNT dispersion liquid was injected gently. At this time, the 0.5 wt % Brij CNT dispersion liquid was put gently near the liquid level of the 2 wt % Brij aqueous solution so that the 2 wt % Brij aqueous solution and the 0.5 wt % Brij CNT dispersion liquid do not diffuse. A 0.5 wt % Brij CNT dispersion liquid layer 305C was laminated above the 2 wt % Brij layer 306C. Furthermore, water was injected gently. A water layer 304C was laminated above the 0.5 wt % Brij CNT dispersion liquid layer 305C.

(3) Separation Operation

A DC voltage (50 V) was applied between the lower electrode 302 (the negative electrode) and the upper electrode 303 (the positive electrode) in the separation apparatus 300C. Similarly, a DC voltage (50 V) was applied also in the separation apparatus 400C (FIG. 18B) in the comparative example which will be described later. That is to say, a DC electric field was applied from the top to the bottom in the direction of gravitational force.

Comparative Example of Working Example 4

Figure 18B:
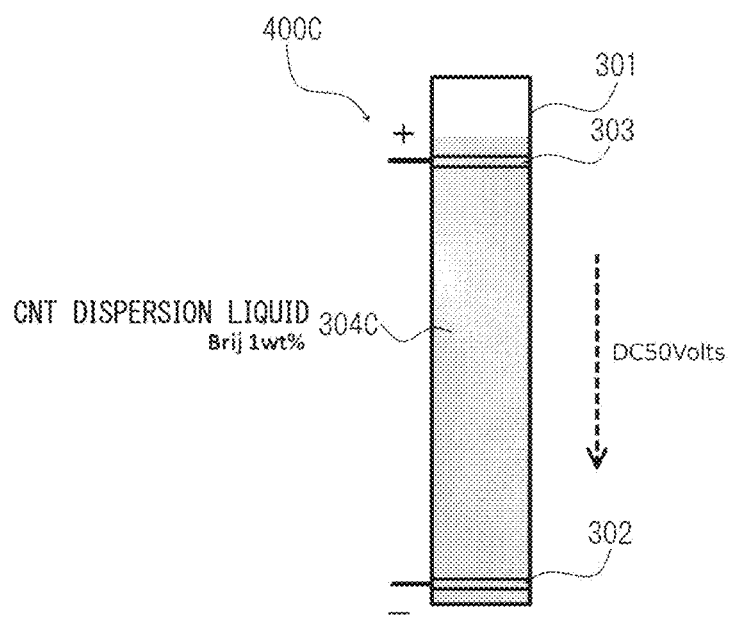
FIG. 18B is a schematic diagram showing electrophoresis conditions compared to those of FIG. 18A.

As shown in FIG. 18B, a comparative example of Working Example 4 was performed as in Working Example 4 except that, as a separation liquid, only a dispersion liquid (CNT) in which single-walled carbon nanotubes (eDIPS single-walled carbon nanotubes) was dispersed in an aqueous solution in which 1 wt % of a surfactant was dissolved was used.

Figure 19A:
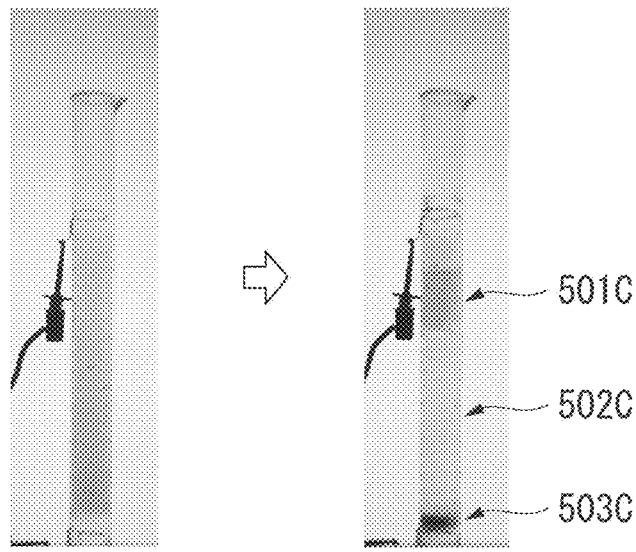
FIG. 19A is a photograph showing a sample movement state before and after electrophoresis in an example of FIG. 18A.
Figure 19B:
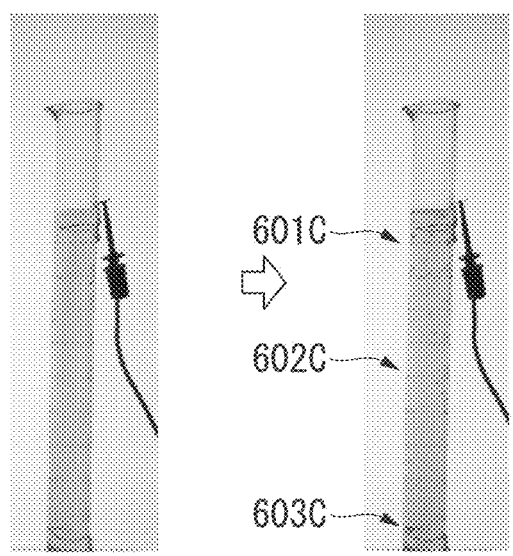
FIG. 19B is a photograph showing a sample movement state before and after electrophoresis in an example of FIG. 18B.

After the voltage application was completed, it was confirmed that a layer in an electrophoresis tank 301 was formed. FIGS. 19A and 19B show photographs of the electrophoresis tank 301 before and after a separation operation in Working Example 4 and the comparative example thereof. In the final state in the separation operation, three layers, i.e., a region (501C or 601C) containing a large amount of metallic single-walled carbon nanotubes, a transparent region (502C or 602C), and a region (503C or 603C) containing a large amount of semiconducting single-walled carbon nanotubes, was formed.

According to FIGS. 19A and 19B, in Working Example 4, the region (501C) containing a large amount of metallic single-walled carbon nanotubes and the region (503C) containing a large amount of semiconducting single-walled carbon nanotubes were formed closer to the vicinity of the lower electrode 302 (the negative electrode) and the upper electrode 303 (the positive electrode) than in the comparative example thereof. Furthermore, each of the concentration thereof was also higher.

After the voltage application was completed, the liquid was recovered from an upper part of the electrophoresis tank 301 so that 11 fractions were obtained per about 1 mL. The fractions were #1, #2, . . . , and #11 from the positive electrode side (the upper part) of the electrophoresis tank 301.

A refractive index distribution and a migration current were evaluated for the samples after separation (the fractions) in Working Example 4 and the comparative example thereof.

Figure 20:
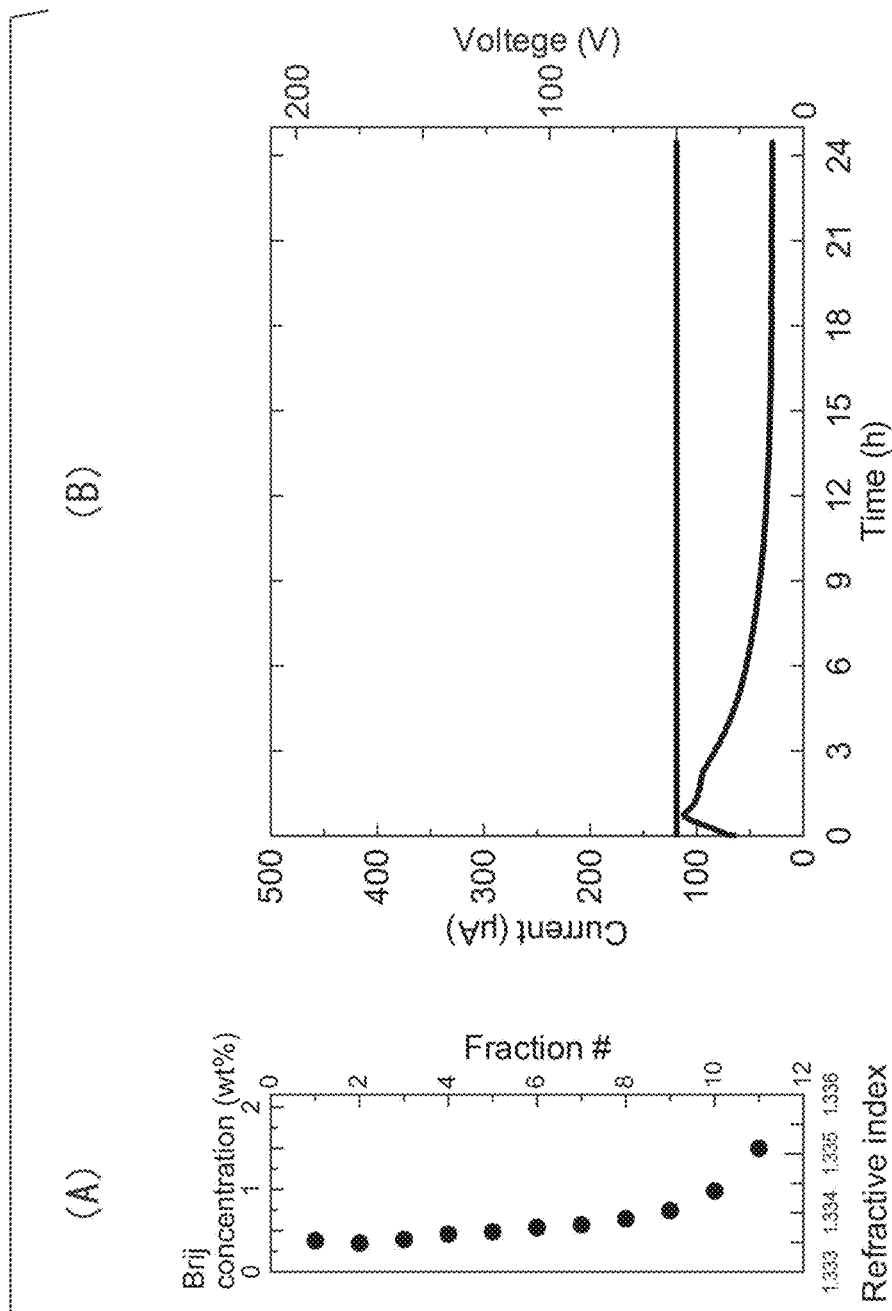
FIG. 20 is a graph showing samples after separation in the example of FIG. 18A, (A) of FIG. 20 shows a refractive index distribution, and (B) of FIG. 20 shows a migration current and an applied voltage.

(A) and (B) of FIG. 20 are graphs showing the refractive index distribution and the migration current of the samples after separation in Working Example 4 in order.

Figure 21:
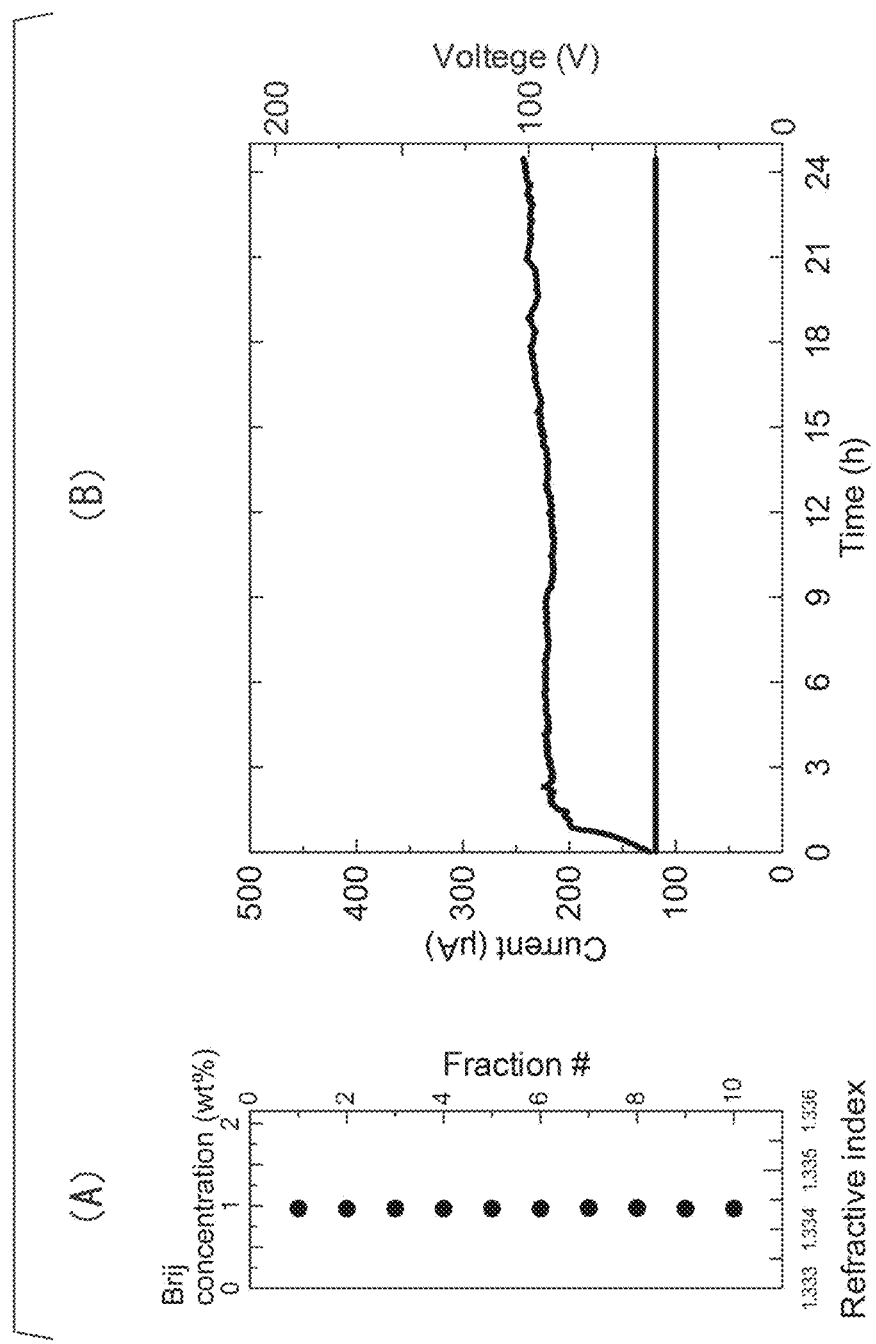
FIG. 21 is a graph showing samples after separation in the example of FIG. 18B, (A) of FIG. 21 shows a refractive index distribution, and (B) of FIG. 21 shows a migration current and an applied voltage.

(A) and (B) of FIG. 21 are graphs showing the refractive index distribution and the migration current of the samples after separation in the comparative example of Working Example 4 in order.

From (A) of FIG. 20, in Working Example 4, a concentration gradient is observed from 0.25 wt % to 1.5 wt % for a concentration of the surfactant indexed from the refractive index from fraction #1 to fraction #11. On the other hand, from (A) of FIG. 21, almost no concentration gradient is observed in the comparative example.

From this, even in a state in which a DC electric field is applied from the top to the bottom in the direction of gravitational force, it is inferred that, in Working Example 4, the convection in the electrophoresis tank was minimized and the metallic single-walled carbon nanotubes and the semiconducting single-walled carbon nanotubes were stably separated. On the other hand, it is inferred that, in the comparative example, the convection occurred, the dispersion liquid was stirred as a whole, and the metallic single-walled carbon nanotubes and the semiconducting single-walled carbon nanotubes were not stably separated. That is to say, when the metallic single-walled carbon nanotubes and the semiconducting single-walled carbon nanotubes were not stably separated (the comparative example), a concentration gradient of the surfactant effective for separation was not formed.

Also, from (B) of FIG. 20, it can be seen that, in Working Example 4, the migration current steadily and gradually decreases with the passage of time. On the other hand, from (B) of FIG. 21, in the comparative example, the current value of the migration current is higher than that of Working Example 4 and unstable. From this, it is inferred that the convection in the electrophoresis tank 301 in Working Example 4 is minimized compared to the comparative example.

Figure 22:
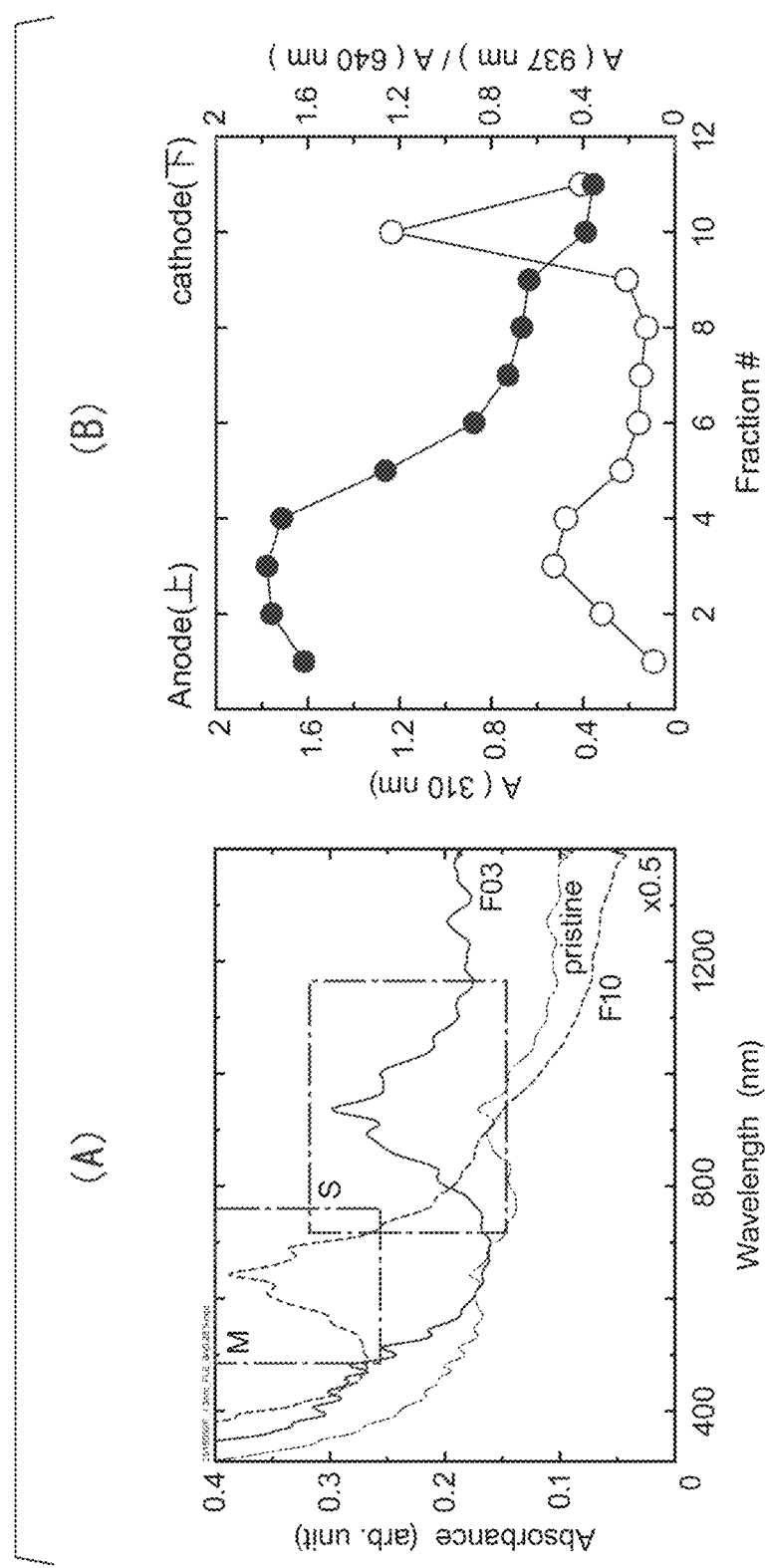
FIG. 22 is a graph showing samples after separation in the example of FIG. 18A, (A) of FIG. 22 shows an absorption spectrum, and (B) of FIG. 22 shows the fraction dependency.

FIG. 22A is an absorption spectrum of the samples after separation in the example of FIG. 18A. FIG. 22A shows the measurement results of the recovered fractions #3 (F03) and #10 (F10) and the liquid (pristine) before separation.

FIG. 22B shows absorption spectra of fractions #1, . . . , and #11 at the time of 310 nm, 640 nm, and 937 nm excitation.

Reference symbol S in FIG. 22A denotes an absorption peak derived from semiconducting single-walled carbon nanotubes and reference symbol M denotes an absorption peak derived from metallic single-walled carbon nanotubes. From areas in the peaks derived from the semiconducting and metallic single-walled carbon nanotubes, the percentages of the amounts of the semiconducting and metallic single-walled carbon nanotubes in each of the fractions can be calculated.

From FIG. 22B, it can be confirmed that the purity of separation increases so that the absorptivity of the metallic single-walled carbon nanotubes is high in fraction #10 in the negative electrodeside (metal) and the absorptivity of the semiconducting single-walled carbon nanotubes in fraction #3 in the positive electrodeside (semicon).

Figure 23:
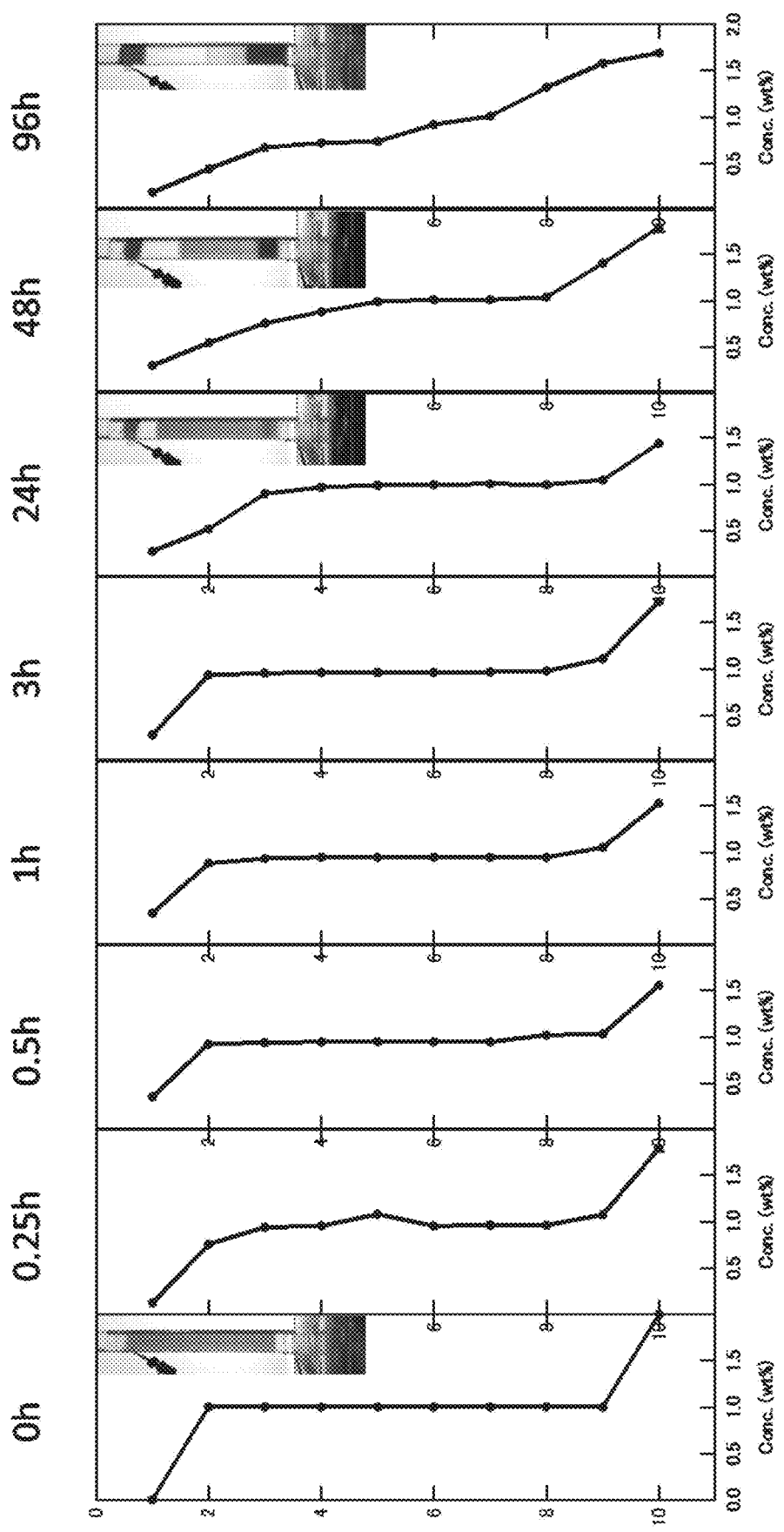
FIG. 23 is a graph showing a change in density distribution of a surfactant in a dispersion liquid with respect to elapsed time during electrophoresis.

FIG. 23 is a graph showing a change in density distribution of a surfactant in a dispersion liquid with respect to elapsed time during electrophoresis. Non-ionic surfactants have a negative charge. For this reason, as shown in FIG. 23, when a DC voltage is applied in the electrophoresis tank 301, a surfactant electrophoreses due to the electric field thereof.

Therefore, when the lower side in the direction of gravitational force is set to be a positive electrode and the upper side is set to be a negative electrode, the surfactant migrates toward the positive electrode. As a result, a concentration gradient was formed from the bottom to the top in the direction of gravitational force with the passage of time and the separation of the metallic single-walled carbon nanotubes and the semiconducting single-walled carbon nanotubes was promoted. In the working example, the dispersion liquids were laminated in advance so that the concentration gradient was formed from the bottom to the top in the direction of gravitational force in the electrophoresis tank 301. Thus, as a result, the separation of the metallic single-walled carbon nanotubes and the semiconducting single-walled carbon nanotubes was promoted regardless of the application direction of the DC voltage.

Working Example 5

"Preparation of Single-Walled Carbon Nanotube Dispersion Liquid"

A solution AA in which 1 wt % of a non-ionic surfactant was dissolved in heavy water was prepared.

A mixed material including single-walled carbon nanotubes (eDIPS (enhanced Direct Injection Pyrolytic Synthesis), single-walled carbon nanotubes; average diameter: 1.3 nm) was introduced into the solution AA.

The mixed material including single-walled carbon nanotubes was dispersed by subjecting the solution AA in which the mixed material including single-walled carbon nanotubes was introduced to ultrasonic dispersion treatment with an output of 40 W for 20 minutes using a horn type ultrasonic crusher (trade name: Digital Sonifier 450 manufactured by BRANSON). After that, the mixed material was subjected to an ultracentrifugation operation at 250000×g and 10° C. for 1 hour using an ultracentrifuge (trade name: CS100GX manufactured by Hitachi Koki Co., Ltd.). Furthermore, a supernatant that was 80% of the mixed material was fractionated to obtain a single-walled carbon nanotube dispersion liquid having an amount of single-walled carbon nanotubes of 10 μg/mL and an amount of the surfactant of 1.0 wt %.

Also, a heavy water solution in which 2 wt % of a non-ionic surfactant was dissolved in heavy water (hereinafter referred to as a "2 wt % Brij heavy water solution") and heavy water were prepared.

"Injection of Single-Walled Carbon Nanotube Dispersion Liquid"

The single-walled carbon nanotube dispersion liquid, heavy water, and the 2 wt % Brij heavy water solution prepared as described above were injected into the electrophoresis tank 101 in the separation apparatus 100 shown in FIG. 6. A height of a total of the single-walled carbon nanotube dispersion liquid, heavy water, and the 2 wt % Brij heavy water solution injected into the electrophoresis tank 101 (a height from the bottom surface of the electrophoresis tank 101 to a liquid surface) was 25 cm. The single-walled carbon nanotube dispersion liquid, heavy water, and the 2 wt % Brij heavy water solution were injected into the electrophoresis tank 101 so that the first electrode 102 is in contact with only heavy water and the second electrode 103 is in contact with only the 2 wt % Brij heavy water solution.

"Separation Operation"

A DC voltage of 120 V was applied to the first electrode 102 (the negative electrode) and the second electrode 103 (the positive electrode) in the separation apparatus 100. The voltage application was stopped after a predetermined time had elapsed and the separation progressed sufficiently.

"Recovery Operation"

After the voltage application was completed, a single-walled carbon nanotube dispersion liquid was recovered from an upper part of the electrophoresis tank 101 so that 15 fractions were obtained per about 6 mL. The fractions were F1, F2, . . . , and F15 from the second electrode 103 side (the lower part) of the electrophoresis tank 101.

"Evaluation"

(Absorbance Measurement of Single-Walled Carbon Nanotube Dispersion Liquid)

The absorbance of the single-walled carbon nanotube dispersion liquid recovered from fraction F1, fraction F4, fraction F8, fraction F11, and fraction F14 was measured using a spectrophotometer (trade name: ultraviolet (UV)-visible near-infrared spectrophotometer UV-3600 manufactured by Shimazu Corporation).

Figure 24:
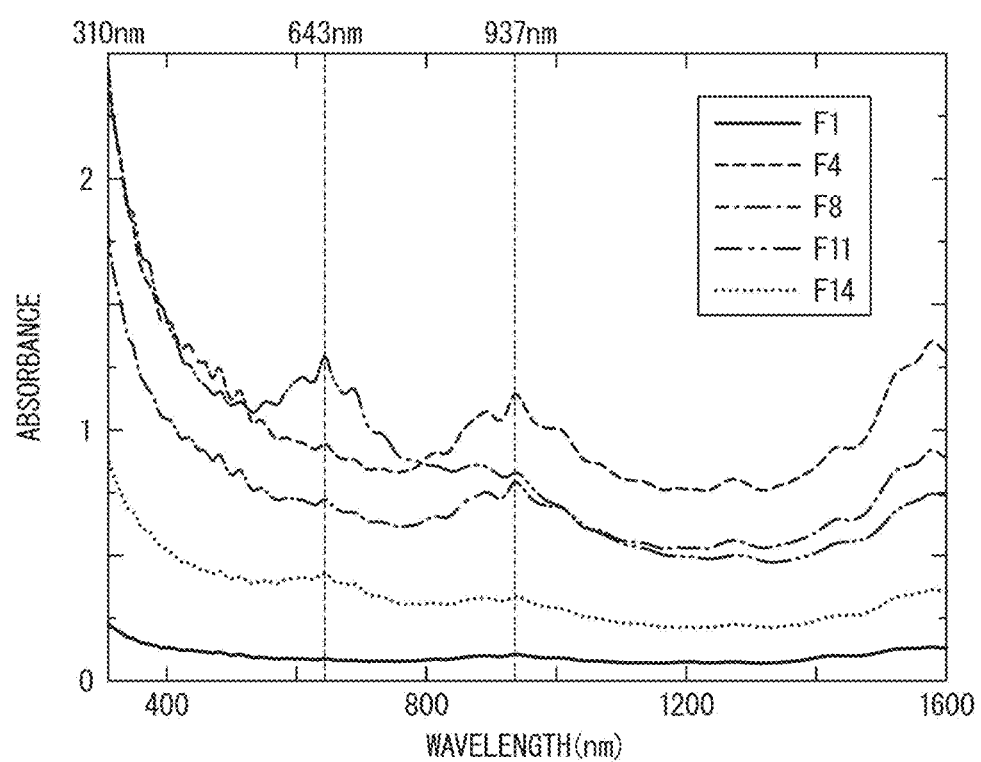
FIG. 24 is a diagram showing an absorption spectrum of a dispersion liquid of a single-walled carbon nanotube after a separation operation in Working Example 5.

FIG. 24 shows the results thereof.

In FIG. 24, a vertical axis represents the absorbance of the single-walled carbon nanotube dispersion liquid and a horizontal axis represents wavelengths.

From the results of FIG. 24, in the absorbance spectrum of the single-walled carbon nanotube dispersion liquid recovered from the fractions F1 and F14, the peak at a wavelength of 643 nm and the wavelength of 937 nm was very small. Therefore, it was confirmed that the fractions F1 and F14 contained almost no metallic single-walled carbon nanotubes and semiconducting single-walled carbon nanotubes.

In the absorbance spectrum of the single-walled carbon nanotube dispersion liquid recovered from the fraction F4 and the fraction F8, the peak at a wavelength of 643 nm was very small and a large peak at a wavelength of 937 nm was observed. Therefore, it was confirmed that the fraction F4 and the fraction F8 did not contain metallic single-walled carbon nanotubes, but contained a large amount of semiconducting single-walled carbon nanotubes.

In the absorbance spectrum of the single-walled carbon nanotube dispersion liquid recovered from the fraction F11, the peak at a wavelength of 937 nm was small and a large peak at a wavelength of 643 nm was observed. Therefore, it was confirmed that the fraction F11 contained almost no semiconducting single-walled carbon nanotubes, but contained a large amount of metallic single-walled carbon nanotubes.

Working Example 6

In Working Example 6, a solution AA in which 1 wt % of a non-ionic surfactant was dissolved in heavy water was prepared.

A mixed material including single-walled carbon nanotubes (eDIPS (enhanced Direct Injection Pyrolytic Synthesis), single-walled carbon nanotubes; average diameter: 1.0 nm) was introduced into the solution AA.

The mixed material including single-walled carbon nanotubes was dispersed by subjecting the solution AA in which the mixed material including single-walled carbon nanotubes was introduced to ultrasonic dispersion treatment with an output of 40 W for 20 minutes using a horn type ultrasonic crusher (trade name: Digital Sonifier 450 manufactured by BRANSON). After that, the mixed material was subjected to an ultracentrifugation operation at 250000×g and 10° C. for 1 hour using an ultracentrifuge (trade name: CS100GXII manufactured by Hitachi Koki Co., Ltd.). Furthermore, a supernatant that was 80% of the mixed material was fractionated to obtain a single-walled carbon nanotube dispersion liquid having an amount of single-walled carbon nanotubes of 20 µg/mL and an amount of the surfactant of 1.0 wt %.

Subsequently, a solution BB in which 2 wt % of non-ionic surfactant was dissolved in heavy water was prepared.

15 mL of heavy water was gently injected into an electrophoresis tank with a volume of 100 mL through the injection/recovery port of the bottom portion of the separation apparatus using a peristaltic pump.

Subsequently, similarly, 70 mL of the prepared single-walled carbon nanotube dispersion liquid was gently injected.

Also, similarly, 10 mL of the solution BB adjusted as described above was gently injected.

Figure 25:
FIG. 25 is a diagram showing a layer structure of a solution before a separation operation in an electrophoresis tank in Working Example 6.

As a result, as shown in FIG. 25, a laminated structure of a solution with 3 layers, i.e., a region in contact with the first electrode (the negative electrode) being heavy water, a region in contact with the second electrode (the positive electrode) being the solution BB (the 2 wt % heavy water solution), an intermediate region being a single-walled carbon nanotube dispersion liquid, was formed (the first electrode and the second electrode are unclear and thus difficult to distinguish them in FIG. 25).

Figure 26:
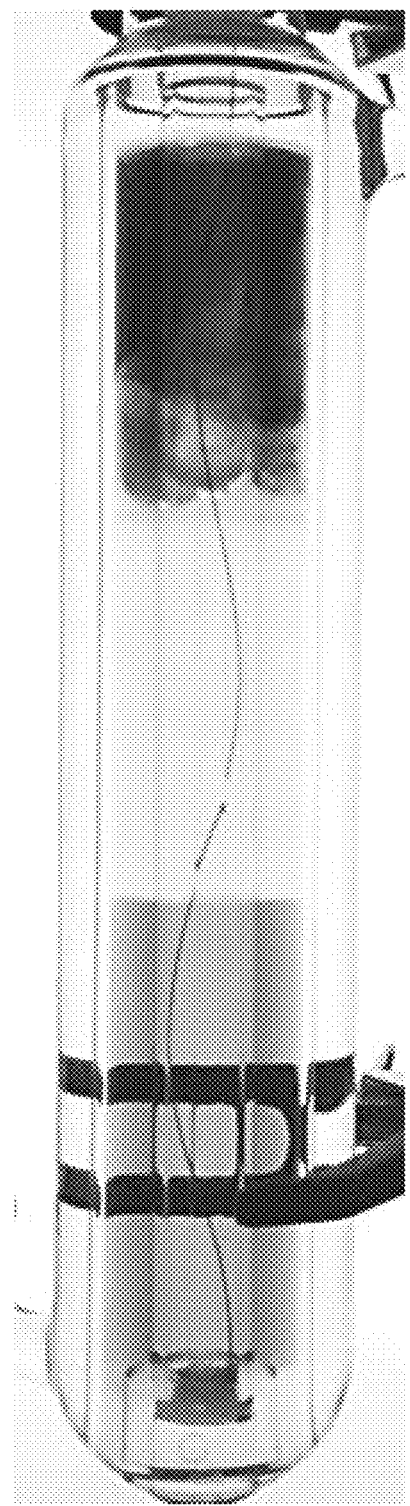
FIG. 26 is a diagram showing a layer structure of a solution after a separation operation in an electrophoresis tank in Working Example 6.

Subsequently, as in Working Example 5, a DC voltage of 120 V was applied to the first electrode (the negative electrode) and the second electrode (the positive electrode). After a predetermined time had elapsed, as shown in FIG. 26, single-walled carbon nanotubes were separated into two regions, i.e., an upper region and a lower region in the electrophoresis tank, and an intermediate having almost no color was formed between the two regions.

After the application of the DC voltage to the first electrode and the second electrode was stopped, a solution inside the electrophoresis tank was gently recovered through the injection/recovery port of the bottom portion of the separation apparatus using a peristaltic pump. The solution was divided into 15 fractions per about 6 mL in order of recovery. That is to say, the fractions were F1, F2, . . . , and F15 in order from the lower part of the electrophoresis tank.
(Absorbance Measurement of Single-Walled Carbon Nanotube Dispersion Liquid)

The absorbance of the single-walled carbon nanotube dispersion liquid recovered from the fraction F2 and the fraction F12 was measured using a spectrophotometer (trade name: UV-visible near-infrared spectrophotometer UV-3600 manufactured by Shimazu Corporation).

Figure 27:
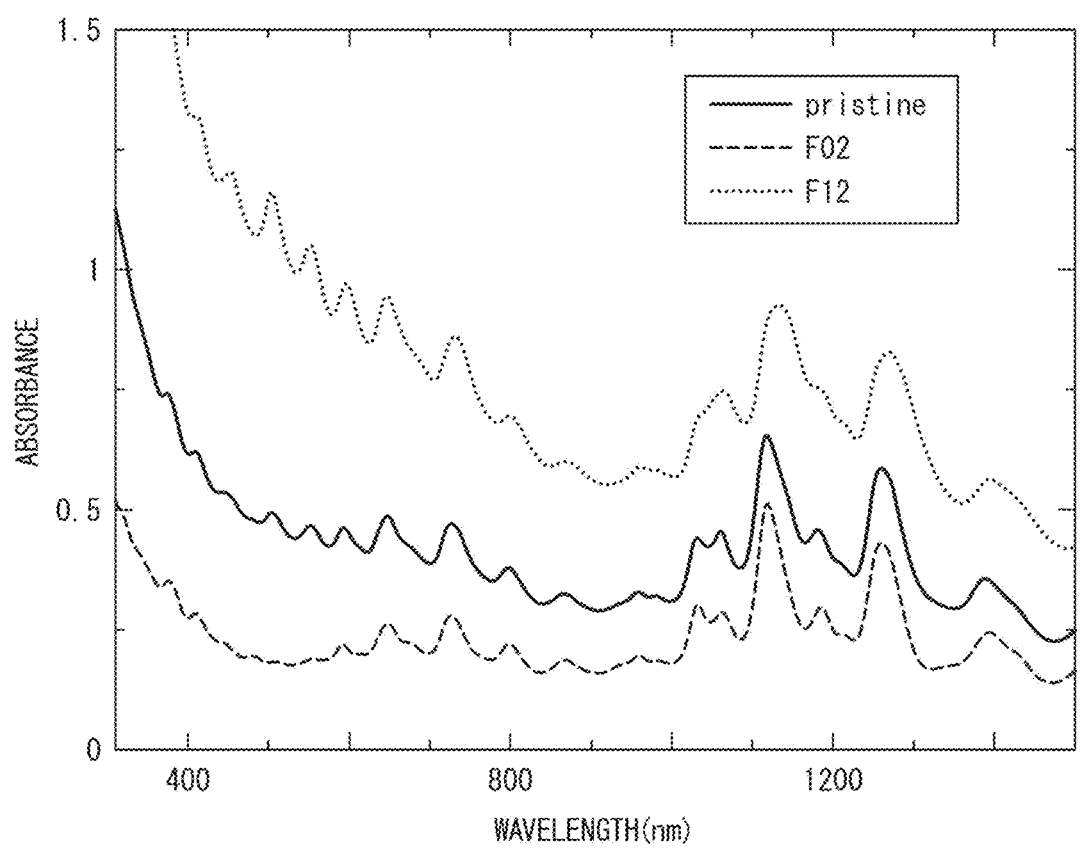
FIG. 27 is a diagram showing an absorption spectrum of a dispersion liquid of a single-walled carbon nanotube after a separation operation in Working Example 6.
Figure 28:
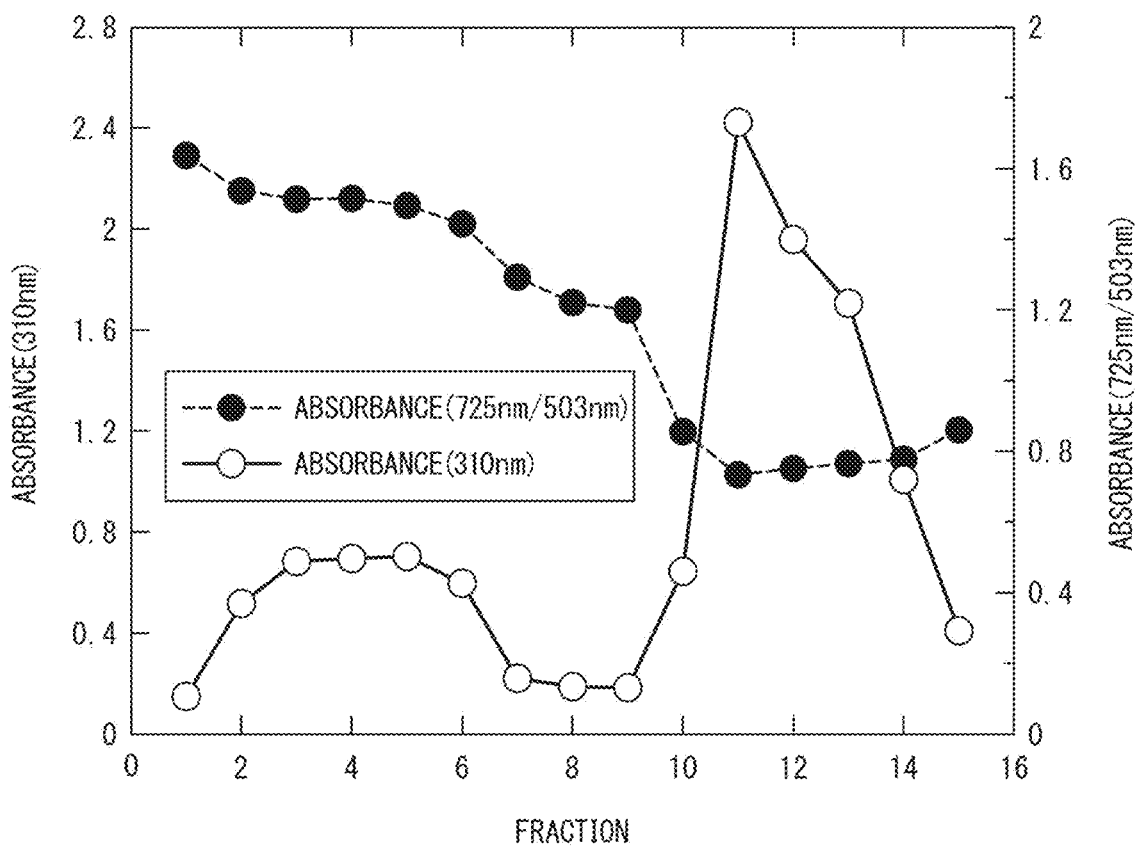
FIG. 28 is a diagram showing the absorbance of the dispersion liquid of the single-walled carbon nanotube after the separation operation in Working Example 6.

FIGS. 27 and 28 show the results thereof.

In FIG. 27, a vertical axis represents the absorbance of the single-walled carbon nanotube dispersion liquid and a horizontal axis represents wavelengths. Furthermore, in FIG. 27, the peak at a wavelength of 503 nm is affected by metallic single-walled carbon nanotubes and the peak at a wavelength of 725 nm is affected by semiconducting single-walled carbon nanotubes.

From the results of FIG. 27, in the absorbance spectrum of the single-walled carbon nanotube dispersion liquid recovered from the fraction F2, the peak at a wavelength of 503 nm was very small and a large peak at a wavelength of 725 nm was observed. Therefore, it was confirmed that the fraction F2 did not contain metallic single-walled carbon nanotubes, but contained a large amount of semiconducting single-walled carbon nanotubes.

In the absorbance spectrum of the single-walled carbon nanotube dispersion liquid recovered from the fraction F12, the peak at a wavelength of 725 nm was small and a large peak at a wavelength of 503 nm was observed. Therefore, it was confirmed that the fraction F12 hardly contained semiconducting single-walled carbon nanotubes, but contained a large amount of metallic single-walled carbon nanotubes.

In FIG. 28, a vertical axis on the left represents the absorbance of the single-walled carbon nanotube dispersion liquid at a wavelength of 310 nm, a vertical axis on the right represents a value obtained by dividing the absorbance of the single-walled carbon nanotube dispersion liquid at a wavelength of 725 nm by the absorbance of the single-walled carbon nanotube dispersion liquid at a wavelength of 503 nm, and a horizontal axis represents fractions. That is to say, the vertical axis on the right in FIG. 28 corresponds to the purity of semiconducting single-walled carbon nanotubes. Furthermore, the absorbance of the single-walled carbon nanotube dispersion liquid at a length of 310 nm corresponds to the concentration of single-walled carbon nanotubes.

From the results shown in FIG. 28, the absorbance of the single-walled carbon nanotube dispersion liquid at a wavelength of 310 nm is larger in the fractions F2 to F6 and the fraction F10 to F14. Thus, it could be seen that single-walled carbon nanotubes were separated into two regions in the separation tank. Furthermore, in the fractions F2 to F6, a value obtained by dividing the absorbance of the single-walled carbon nanotube dispersion liquid at a wavelength of 725 nm by the absorbance of the single-walled carbon nanotube dispersion liquid at a wavelength of 503 nm is large. Thus, it could be seen that semiconducting single-walled carbon nanotubes of high purity were obtained. In the fractions F10 to F14, a value obtained by dividing the absorbance of the single-walled carbon nanotube dispersion liquid at a wavelength of 725 nm by the absorbance of the single-walled carbon nanotube dispersion liquid at a wavelength of 503 nm is small. Thus, it could be seen that metallic single-walled carbon nanotubes of high purity were obtained. Therefore, it was confirmed that highly pure metallic single-walled carbon nanotubes and semiconducting single-walled carbon nanotubes were separated.

Figure 29:
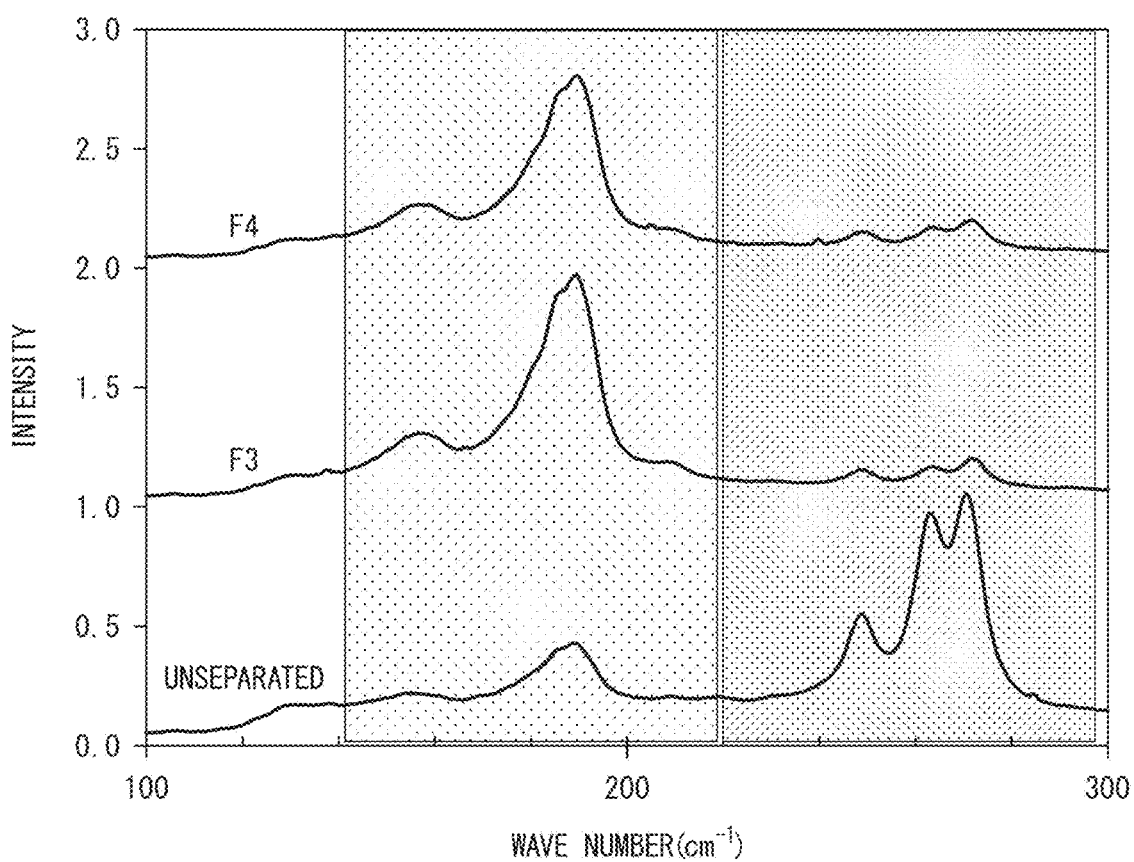
FIG. 29 is a diagram showing a Raman spectrum for a solution after a separation operation in Working Example 6.

FIG. 29 shows a Raman spectrum of a radial breathing mode (RBM) region measured using a microscopic Raman spectrometer (trade name: HR-800 manufactured by Horiba, Ltd.) for the recovered single-walled carbon nanotube dispersion liquid of the fractions F3 and F4 and the single-walled carbon nanotube dispersion liquid (unseparated) before the separation operation. In FIG. 29, a vertical axis represents a normalized intensity, a horizontal axis represents a wave number, and an excitation wavelength at the time of measurement is 514 nm. In FIG. 29, the peak of the region of wave number of 140 to 220 ($cm^{-1}$) is derived from the semiconducting single-walled carbon nanotubes and the peak of the region of wave number of 220 to 300 ($cm^{-1}$) is derived from the metallic single-walled carbon nanotubes. The single-walled carbon nanotube dispersion liquid (unseparated) before the separation operation contains a large amount of metallic single-walled carbon nanotubes, but it could be seen that, in the fractions F3 and F4, the peak derived from the metallic single-walled carbon nanotubes is very small and the peak derived from the semiconducting single-walled carbon nanotubes is large. When these peaks were analyzed in detail, it was estimated that the purity of the semiconducting single-walled carbon nanotubes in the fractions F3 and F4 is about 98%.

High purity semiconducting single-walled carbon nanotubes were obtained using the method for separating nanocarbons of the present invention.

As described above, according to the working examples of the present invention, the working examples of the case in which, in the separation apparatus 100 shown in FIG. 6, the first electrode 102 provided at the upper part thereof was set to be the negative electrode, the second electrode 103 provided at the lower part thereof was set to be the positive electrode, and an upward electric field was applied in the electrophoresis tank 101 having an I-shaped structure has been described. However, the nanocarbon separation method of the present invention is not limited to this. In the separation apparatus 100, the first electrode 102 may be a positive electrode and the second electrode 103 may be a negative electrode.

Reference Example 1

In Reference Example 1, solutions having concentrations of a non-ionic surfactant being 0 wt %, 1 wt %, 2 wt %, 3 wt %, 4 wt %, 5 wt %, 6 wt %, 7 wt %, 8 wt %, 9 wt %, and 10 wt %, the solutions in which the surfactant was dissolved in water were prepared.

The density of the solutions with the surfactant of each concentration was measured using a density gravimeter (trade name: DA-650 manufactured by Kyoto Denshi Kogyo Co., Ltd.).

Figure 30:
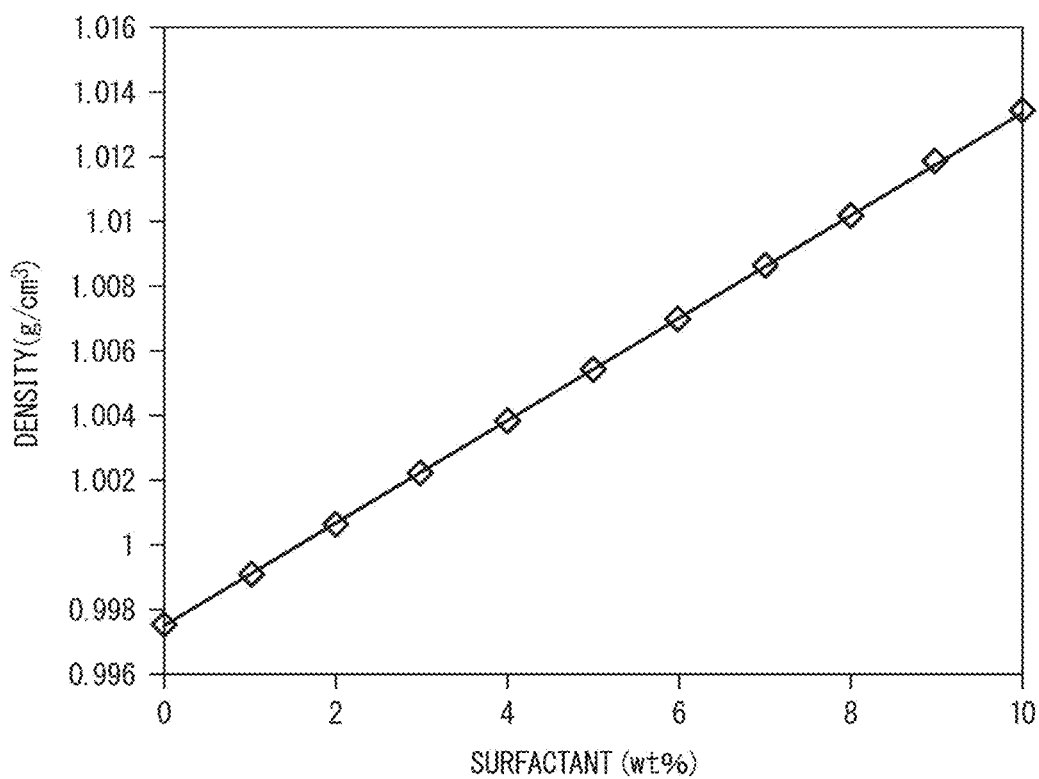
FIG. 30 is a graph showing a relationship between a concentration of a surfactant and a density of a solution in Reference Example 1.

FIG. 30 shows a relationship between the concentration of the surfactant and the density of the solution.

From the results in FIG. 28, it was confirmed that the concentration of the surfactant and the density of the solution were in a proportional relationship. The graph shown in FIG. 30 was used as a calibration curve for calculating the specific gravity of the solution in Working Example 7 (Experimental Example 1) to Working Example 26 (Experimental Example 20) which will be described later.

Reference Example 2

In Reference Example 2, solutions having concentrations of a non-ionic surfactant being 0 wt %, 1 wt %, 2 wt %, 3 wt %, 4 wt %, 5 wt %, 6 wt %, 7 wt %, 8 wt %, 9 wt %, and 10 wt %, the solutions in which the surfactant was dissolved in heavy water were prepared.

The density of the solutions with the surfactant of each concentration was measured using a density gravimeter (trade name: DA-650 manufactured by Kyoto Denshi Kogyo Co., Ltd.).

Figure 31:
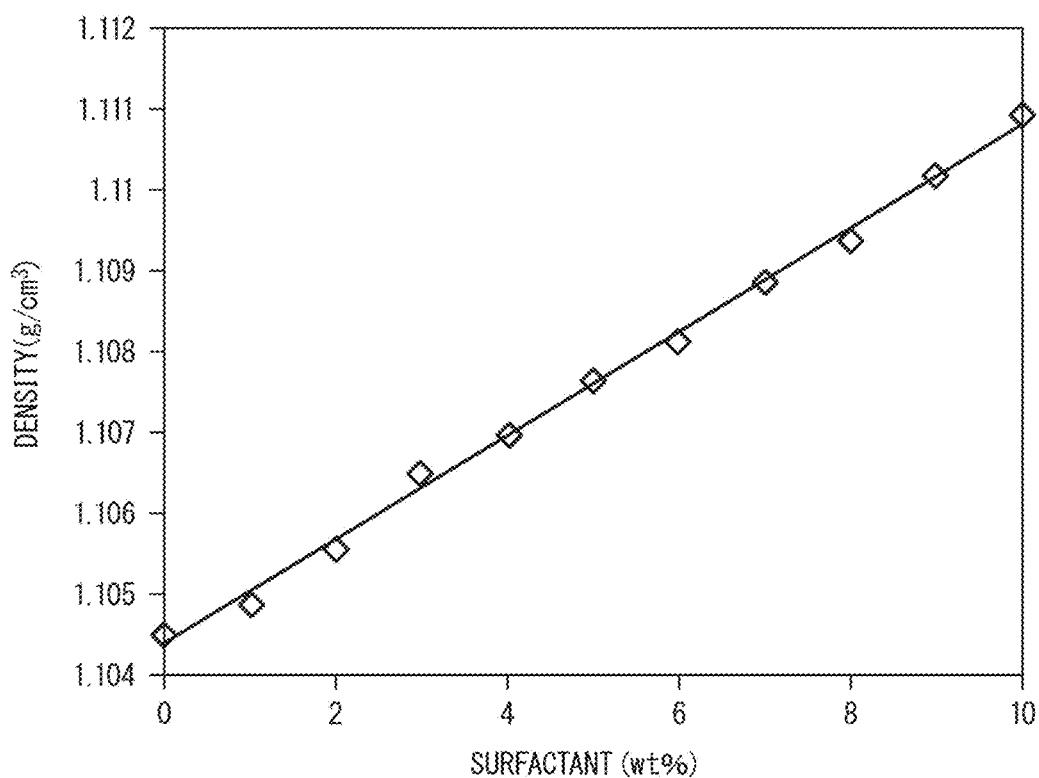
FIG. 31 is a graph showing a relationship between a concentration of a surfactant and a density of a solution in Reference Example 2.

FIG. 31 shows a relationship between the concentration of the surfactant and the density of the solution.

From the results in FIG. 31, it was confirmed that the concentration of the surfactant and the density of the solution were in a proportional relationship. The graph shown in FIG. 31 was used as a calibration curve for calculating the specific gravity of the solution in Working Example 7 (Experimental Example 1) to Working Example 26 (Experimental Example 20) which will be described later.

Working Example 7 (Experimental Example 1)

Description will be described below with reference to FIG. 6.
(1) Preparation of Separation Liquids A heavy water solution in which 1 wt % of a non-ionic surfactant was dissolved in heavy water was prepared. A single-walled carbon nanotube mixture (eDIPS single-walled carbon nanotubes) was introduced into this dispersion medium. The introduced liquid was subjected to ultrasonic dispersion treatment using a horn type ultrasonic crusher (output: about 300 W; during 30 minutes). After that, the introduced liquid was subjected to an ultracentrifugation operation and a supernatant that is 50% of the introduced liquid was obtained as a CNT dispersion liquid.

Also, a heavy water solution in which 2 wt % of a non-ionic surfactant was dissolved in heavy water (hereinafter referred to as a "2 wt % Brij heavy water solution") and heavy water were prepared.

The specific gravities of the CNT dispersion liquid, heavy water, and the 2 wt % Brij heavy water solution were calculated using the graph shown in FIG. 31.
(2) Injection of Liquids The CNT dispersion liquid, heavy water, and the 2 wt % Brij heavy water solution were injected into the electrophoresis tank 101 of the separation apparatus 100 shown in FIG. 6. First, the 2 wt % Brij heavy water solution was put into the electrophoresis tank 101. The 2 wt % Brij layer 220A (the layer made of the lower layer solution 220 in the electrophoresis tank 101) was formed using the put-in 2 wt % Brij heavy water solution. Subsequently, the CNT dispersion liquid was gently injected into the electrophoresis tank 101 of the separation apparatus 100 so that the CNT dispersion liquid layer 230A (the layer made of an intermediate layer solution 230 in the electrophoresis tank 101) was laminated above the 2 wt % Brij layer 220A. Finally, water was gently injected into the electrophoresis tank 101 of the separation apparatus 100 so that the water layer 210A (the layer made of the upper layer solution 210 in the electrophoresis tank 101) was laminated above the CNT dispersion liquid layer 305. As described above, a specific gravity gradient decreasing from the bottom to the top thereof in the direction of gravitational force was formed in the liquids in the electrophoresis tank 101.

(3) Separation Operation

A DC voltage (120 V) was applied between the lower second electrode 103 (the positive electrode) and the upper first electrode 102 (the negative electrode) of the separation apparatus 100.

After the voltage application was completed, it was confirmed that the layers in the electrophoresis tank 101 were formed. A state in which the separation operation was completed was a state in which three layer, i.e., a region containing a large amount of metallic single-walled carbon nanotubes (an upper region in region (the electrophoresis tank 101), a transparent region (an intermediate region in the electrophoresis tank 101), and a region containing a large amount of semiconducting single-walled carbon nanotubes (a lower region in the electrophoresis tank 101) were formed.

(4) Calculation of Purity of Semiconducting Single-Walled Carbon Nanotubes

In the same manner as in Working Example 6, a Raman spectrum of a radial breathing mode (RBM) region of a CNT dispersion liquid recovered from a region containing a large amount of semiconducting single-walled carbon nanotubes was measured using a microscopic Raman spectrometer (trade name: HR-800 manufactured by Horiba Ltd.). When the peaks of the obtained Raman spectrum were analyzed in detail, it was estimated that the purity of the semiconducting single-walled carbon nanotubes exceeds 97%.

Table 1 shows the compositions and the specific gravities of the CNT dispersion liquid before the separation operation, the solution which forms the lower layer in the electrophoresis tank 101 (hereinafter referred to as a "lower layer solution" in Table 1), and the solution which forms the upper layer in the electrophoresis tank 101 (hereinafter referred to as an "upper layer solution.") Furthermore, Table 1 shows the directions of applied voltage and electric field in the separation operation. It should be noted that, in Table 1, when the direction of the electric field is represented by "f," it indicates that the direction of the electric field is directed upward from the bottom of the electrophoresis tank 101, and when the direction of the electric field is represented by "1." it indicates that the direction of the electric field is directed downward from the top of the electrophoresis tank 101. Furthermore. Table 1 shows the purity of the semiconducting single-walled carbon nanotubes.

Each of the specific gravities of the CNT dispersion liquid shown in Table 1 are the specific gravities of a Brij aqueous solution and a Brij heavy water solution containing single-walled carbon nanotubes dispersed therein.

Working Example 8 (Experimental Example 2) to
Working Example 26 (Experimental Example 20)

A separation operation was performed in the same manner in as Working Example 7 (Experimental Example 1) except that, regarding the CNT dispersion liquid before the separation operation, the lower layer solution in the electrophoresis tank 301, and the upper layer solution in the electrophoresis tank 301, the composition, the specific gravity, and the directions of the applied voltage and the electric field in the separation operation were as shown in Table 1.

Also, in the same manner as in Working Example 6, the purity of the semiconducting single-walled carbon nanotubes was calculated. It should be noted that, in Working Example 8 (Experimental Example 2) to Working Example 26 (Experimental Example 20), when water is used as a dispersion medium, the specific gravities of the CNT dispersion liquid, water, and the Brij aqueous solution were calculated using the graph shown in FIG. 30. Furthermore, when heavy water is used as a dispersion medium, the specific gravities of the CNT dispersion liquid, heavy water, and the Brij heavy water solution were calculated using the graph shown in FIG. 31.

Table 1 shows the results thereof.

TABLE 1

| | CNT | | | UPPER LAYER SOLUTION | | CNT DISPERSION LIQUID | |
| --- | --- | --- | --- | --- | --- | --- | --- |
| | AVERAGE DIAMETER [nm] | SOLVENT | SURFACTANT | CONCENTRATION OF SURFACTANT [wt %] | SPECIFIC GRAVITY | AMOUNT OF CNT [μg/mL] | CONCENTRATION OF SURFACTANT [wt %] |
| EXPERIMENTAL EXAMPLE 1 | 1.0 | HEAVY WATER | BrijS100 | 0.0 | 1.10437 | 15.62 | 1.00 |
| EXPERIMENTAL EXAMPLE 2 | 1.0 | HEAVY WATER | BrijS100 | 0.0 | 1.10437 | 16.25 | 1.00 |
| EXPERIMENTAL EXAMPLE 3 | 1.3 | HEAVY WATER | BrijS100 | 0.0 | 1.10437 | 39.49 | 1.00 |
| EXPERIMENTAL EXAMPLE 4 | 1.0 | WATER | BrijS100 | 0.0 | 0.99747 | 4.53 | 1.00 |
| EXPERIMENTAL EXAMPLE 5 | 1.0 | WATER | BrijS100 | 0.0 | 0.99747 | 18.45 | 1.00 |
| EXPERIMENTAL EXAMPLE 6 | 1.0 | HEAVY WATER | BrijS100 | 0.0 | 1.10437 | 8.2 | 0.20 |
| EXPERIMENTAL EXAMPLE 7 | 1.0 | WATER | BrijS100 | 0.0 | 0.99747 | 6.44 | 0.25 |
| EXPERIMENTAL EXAMPLE 8 | 1.0 | HEAVY WATER | BrijS100 | 0.0 | 1.10437 | 9.15 | 0.50 |

TABLE 1-continued

| | | | | | | | |
|---|---|---|---|---|---|---|---|
| EXPERIMENTAL EXAMPLE 9 | 1.0 | HEAVY WATER | BrijS100 | 0.0 | 1.10437 | 13.39 | 0.50 |
| EXPERIMENTAL EXAMPLE 10 | 1.0 | HEAVY WATER | BrijS100 | 0.0 | 1.10437 | 13.74 | 0.50 |
| EXPERIMENTAL EXAMPLE 11 | 1.0 | WATER | BrijS100 | 0.0 | 0.99747 | 10 | 0.50 |
| EXPERIMENTAL EXAMPLE 12 | 1.0 | HEAVY WATER | BrijS100 | 0.0 | 1.10437 | 9.31 | 0.50 |
| EXPERIMENTAL EXAMPLE 13 | 1.0 | WATER | BrijS100 | 0.0 | 0.99747 | 9.85 | 1.50 |
| EXPERIMENTAL EXAMPLE 14 | 1.0 | WATER | BrijS100 | 0.0 | 0.99747 | 7.52 | 2.50 |
| EXPERIMENTAL EXAMPLE 15 | 1.0 | HEAVY WATER | BrijS100 | 0.5 | 1.10469 | 7.76 | 0.50 |
| EXPERIMENTAL EXAMPLE 16 | 1.0 | HEAVY WATER | BrijS100 | 0.5 | 1.10463 | 8.34 | 0.50 |
| EXPERIMENTAL EXAMPLE 17 | 1.3 | WATER | BrijS100 | 0.0 | 0.99747 | 4.1 | 1.00 |
| EXPERIMENTAL EXAMPLE 18 | 1.3 | WATER | BrijL23 | 0.0 | 0.99747 | 5.17 | 1.00 |
| EXPERIMENTAL EXAMPLE 19 | 1.3 | WATER | BrijS100 | 0.0 | 0.99747 | 3.85 | 0.25 |
| EXPERIMENTAL EXAMPLE 20 | 1.0 | WATER | BrijS100 | 0.0 | 0.99747 | 4.8 | 0.50 |

| | CNT DISPERSION LIQUID SPECIFIC GRAVITY | LOWER LAYER SOLUTION | | VOLTAGE [V] | DIRECTION OF ELECTRIC FIELD | PURITY OF SEMICONDUCTING CNT [%] |
|---|---|---|---|---|---|---|
| | | CONCENTRATION OF SURFACTANT [wt %] | SPECIFIC GRAVITY | | | |
| EXPERIMENTAL EXAMPLE 1 | 1.10503 | 2.0 | 1.10566 | 120 | ↑ | >97 |
| EXPERIMENTAL EXAMPLE 2 | 1.10503 | 2.0 | 1.10566 | 120 | ↑ | >97 |
| EXPERIMENTAL EXAMPLE 3 | 1.10505 | 2.0 | 1.10566 | 120 | ↑ | >97 |
| EXPERIMENTAL EXAMPLE 4 | 0.99907 | 2.0 | 1.00066 | 120 | ↑ | >95 |
| EXPERIMENTAL EXAMPLE 5 | 0.99909 | 2.0 | 1.00066 | 120 | ↑ | >95 |
| EXPERIMENTAL EXAMPLE 6 | 1.1045 | 2.0 | 1.10566 | 120 | ↑ | >95 |
| EXPERIMENTAL EXAMPLE 7 | 0.99788 | 2.0 | 1.00066 | 120 | ↑ | >95 |
| EXPERIMENTAL EXAMPLE 8 | 1.1047 | 2.0 | 1.10566 | 120 | ↑ | >99 |
| EXPERIMENTAL EXAMPLE 9 | 1.1047 | 2.0 | 1.10566 | 120 | ↑ | >99 |
| EXPERIMENTAL EXAMPLE 10 | 1.1047 | 2.0 | 1.10566 | 120 | ↑ | >99 |
| EXPERIMENTAL EXAMPLE 11 | 0.99828 | 2.0 | 1.00066 | 120 | ↑ | >95 |
| EXPERIMENTAL EXAMPLE 12 | 1.1047 | 2.0 | 1.10566 | 200 | ↑ | >99 |
| EXPERIMENTAL EXAMPLE 13 | 0.99987 | 2.0 | 1.00066 | 120 | ↑ | >95 |
| EXPERIMENTAL EXAMPLE 14 | 1.00147 | 4.0 | 1.00385 | 120 | ↑ | >90 |
| EXPERIMENTAL EXAMPLE 15 | 1.1047 | 2.0 | 1.10566 | 120 | ↑ | >97 |
| EXPERIMENTAL EXAMPLE 16 | 1.1047 | 2.0 | 1.10566 | 120 | ↑ | >97 |
| EXPERIMENTAL EXAMPLE 17 | 0.99907 | 4.0 | 1.00385 | 120 | ↑ | >90 |
| EXPERIMENTAL EXAMPLE 18 | 0.99907 | 2.0 | 1.00066 | 120 | ↑ | >90 |
| EXPERIMENTAL EXAMPLE 19 | 0.99787 | 2.0 | 1.00066 | 120 | ↓ | >97 |
| EXPERIMENTAL EXAMPLE 20 | 0.99827 | 2.0 | 1.00066 | 120 | ↓ | >90 |

From the results in Table 1, it was confirmed that the purity of the semiconducting single-walled carbon nanotubes exceeded 90% in Working Example 7 (Experimental Example 1) to Working Example 26 (Experimental Example 20).

Although the present invention has been described above with reference to the embodiments, the present invention is not limited to the embodiments. The configuration and details of the present invention can be modified in various ways that can be understood by those skilled in the art without departing from the scope of the present invention.

INDUSTRIAL APPLICABILITY

The nanocarbon separation method in the present invention can improve separation efficiency in separation of nanocarbons with different properties. Furthermore, it is possible to shorten a time required for separation in separation of carbon nanohorns with different properties.

Some or all of the above embodiments may be described as in the following supplementary notes, but are not limited to the following description.

(Supplementary Note 1) A nanocarbon separation method includes: a step of preparing a plurality of liquids with different specific gravities in which at least one of the plurality of liquids is a dispersion liquid in which a mixture of nanocarbons with different properties is dispersed; a step of sequentially injecting the plurality of liquids into an electrophoresis tank so that the specific gravities of the liquids decrease from a bottom to a top of the liquids in a direction of gravitational force; and a step of separating the mixture of the nanocarbons by moving a part of the mixture of the nanocarbons toward an electrode side disposed in an upper part of the electrophoresis tank and moving a remainder of the mixture of the nanocarbons toward an electrode side disposed in a lower part of the electrophoresis tank by applying a direct current voltage to the electrodes disposed in the upper part and the lower part.

(Supplementary Note 2) The nanocarbon separation method according to supplementary note 1, wherein, in the step of preparing the plurality of liquids, a dispersion liquid in which a mixture of nanocarbons with two or more kinds of different specific gravities is dispersed, is prepared.

(Supplementary Note 3) The nanocarbon separation method according to supplementary note 1 or 2, wherein, in the step of preparing the plurality of liquids, specific gravities of the liquids are adjusted using a concentration of a surfactant added to the liquids.

(Supplementary Note 4) The nanocarbon separation method according to supplementary note 3, wherein the surfactant is a non-ionic surfactant.

(Supplementary Note 5) The nanocarbon separation method according to supplementary note 4, wherein the non-ionic surfactant is a polyoxyethylene alkyl ether represented by the following expression (1):

$$C_nH_{2n}(OCH_2CH_2)_mOH \qquad (1)$$

(where, n=12 to 18 and m=20 to 100).

(Supplementary Note 6) The nanocarbon separation method according to any one of supplementary notes 1 to 5, wherein a solvent contained in the plurality of liquids is water, heavy water, or a mixed solvent of water and heavy water.

(Supplementary Note 7) The nanocarbon separation method according to supplementary note 6, wherein, in the step of preparing the plurality of liquids, the specific gravities of the liquids are adjusted using a mixing ratio of the water and the heavy water.

(Supplementary Note 8) The nanocarbon separation method according to any one of supplementary notes 1 to 7, wherein the electrophoresis tank has a vertical structure.

(Supplementary Note 9) The nanocarbon separation method according to any one of supplementary notes 1 to 8, wherein the electrode disposed in the upper part of the electrophoresis tank is a negative electrode and the electrode disposed in the lower part of the electrophoresis tank is a positive electrode.

(Supplementary Note 10) The nanocarbon separation method according to any one of supplementary notes 1 to 9, wherein the plurality of liquids are three liquids with different specific gravities in which a first liquid has the lowest specific gravity, a second liquid has the highest specific gravity, and a third liquid is the dispersion liquid and has a specific gravity between the specific gravity of the first liquid and the specific gravity of the second liquid, and in the step of sequentially injecting the plurality of liquids, the three liquids with different specific gravities are sequentially injected so that the third liquid is located between the first liquid and the second liquid.

(Supplementary Note 11) The nanocarbon separation method according to supplementary note 10, wherein, in the step of sequentially injecting the plurality of liquids, the three liquids with different specific gravities are sequentially injected so that the electrode disposed in the upper part of the electrophoresis tank is in contact with only the first liquid and the electrode disposed in the lower part of the electrophoresis tank is in contact with only the second liquid.

The nanocarbon separation method according to any one of supplementary notes 1 to 11, wherein the nanocarbons are single-walled carbon nanotubes.

REFERENCE SYMBOLS 1, 1A, 1B, 1C, 100, 300, 300B, 300C, 400, 400B, 400C Separation apparatus
10, 10A, 101, 301 Electrophoresis tank
10Aa, 10Ab Opening portion
20, 30, 302, 303 electrode
40 Injection port
50, 60 Recovery port
102 First electrode
103 Second electrode
104 Electrode member
105 Opening portion
106 Injection/recovery port
107 Cylindrical member
108 Columnar member
109 Fitting member
200 Nanocarbon dispersion liquid

What is claimed is:
1. A nanocarbon separation method comprising:
a step of preparing a plurality of liquids with different specific gravities in which at least one of the plurality of liquids is a dispersion liquid in which a mixture of nanocarbons with different properties is dispersed;
a step of sequentially injecting the plurality of liquids into an electrophoresis tank so that the specific gravities of the liquids decrease from a bottom to a top of the liquids in a direction of gravitational force; and
a step of separating the mixture of the nanocarbons by moving a part of the mixture of the nanocarbons toward an electrode side disposed in an upper part of the electrophoresis tank and moving a remainder of the mixture of the nanocarbons toward an electrode side disposed in a lower part of the electrophoresis tank by applying a direct current voltage to the electrodes disposed in the upper part and the lower part, wherein the plurality of liquids are three liquids with different specific gravities in which a first liquid has the lowest specific gravity of the three liquids with different specific gravities, a second liquid has the highest specific gravity of the three liquids with different specific gravities, and a third liquid is the dispersion liquid and has a specific gravity between the specific gravity of the first liquid and the specific gravity of the second liquid, and in the step of sequentially injecting the plurality of liquids, the three liquids with different specific gravities are sequentially injected so that the third liquid is located between the first liquid and the second liquid.

2. The nanocarbon separation method according to claim 1, wherein, in the step of preparing the plurality of liquids, a dispersion liquid in which a mixture of nanocarbons with two or more kinds of different specific gravities is dispersed, is prepared.

3. The nanocarbon separation method according to claim 1, wherein the electrophoresis tank has a vertical structure.

4. The nanocarbon separation method according to claim 1, wherein the electrode disposed in the upper part of the electrophoresis tank is a negative electrode and the electrode disposed in the lower part of the electrophoresis tank is a positive electrode.

5. The nanocarbon separation method according to claim 1, wherein, in the step of sequentially injecting the plurality of liquids, the three liquids with different specific gravities are sequentially injected so that the electrode disposed in the upper part of the electrophoresis tank is in contact with only the first liquid and the electrode disposed in the lower part of the electrophoresis tank is in contact with only the second liquid.

6. The nanocarbon separation method according to claim 1, wherein the nanocarbons are single-walled carbon nanotubes.

7. The nanocarbon separation method according to claim 1, wherein the electrode disposed in the upper part of the electrophoresis tank is a positive electrode on an outer circumferential surface of an insulating cylindrical member, and the electrode disposed in the lower part of the electrophoresis tank is a negative electrode of which most is disposed in the cylindrical member.

8. The nanocarbon separation method according to claim 1, wherein the electrode disposed in the upper part of the electrophoresis tank is provided on an outer circumferential surface of an insulating cylindrical member, most of the electrode disposed in the lower part of the electrophoresis tank is disposed in the cylindrical member, and in the injection step, the same liquid as the solution which forms the lower part in the electrophoresis tank is injected into the cylindrical member.

9. The nanocarbon separation method according to claim 1, wherein the electrophoresis tank has an injection/recovery port at a lower end, and the dispersion liquid is injected and recovered through the injection/recovery port.

10. The nanocarbon separation method according to claim 1, wherein a solvent contained in the plurality of liquids is water, heavy water, or a mixed solvent of water and heavy water.

11. The nanocarbon separation method according to claim 10, wherein, in the step of preparing the plurality of liquids, the specific gravities of the liquids are adjusted using a mixing ratio of the water and the heavy water.

12. The nanocarbon separation method according to claim 1, wherein, in the step of preparing the plurality of liquids, specific gravities of the liquids are adjusted using a concentration of a surfactant added to the liquids.

13. The nanocarbon separation method according to claim 12, wherein the surfactant is a non-ionic surfactant.

14. The nanocarbon separation method according to claim 13, wherein the non-ionic surfactant is a polyoxyethylene alkyl ether represented by the following expression (1):

$C_nH_{2n}(OCH_2CH_2)_mOH$ (1)

(where, n=12 to 18 and m=20 to 100).

15. The nanocarbon separation method according to claim 13, wherein the non-ionic surfactant is a polyoxyethylene (n) alkyl ether (n is 10 or more and 100 or less and an alkyl chain length is C12 or more and C18 or less), and the amount of the nanocarbons is 1 μg/mL or more and 100 μg/mL or less.

16. A nanocarbon separation method comprising:

a step of preparing a plurality of liquids with different specific gravities in which at least one of the plurality of liquids is a dispersion liquid in which a mixture of nanocarbons with different properties is dispersed;

a step of sequentially injecting the plurality of liquids into an electrophoresis tank so that the specific gravities of the liquids decrease from a bottom to a top of the liquids in a direction of gravitational force; and a step of separating the mixture of the nanocarbons by moving a part of the mixture of the nanocarbons toward an electrode side disposed in an upper part of the electrophoresis tank and moving a remainder of the mixture of the nanocarbons toward an electrode side disposed in a lower part of the electrophoresis tank by applying a direct current voltage to the electrodes disposed in the upper part and the lower part, wherein a solvent contained in the plurality of liquids is water, heavy water, or a mixed solvent of water and heavy water, and in the step of preparing the plurality of liquids, the specific gravities of the liquids are adjusted using a mixing ratio of the water and the heavy water.

17. A nanocarbon separation method comprising:

a step of preparing a plurality of liquids with different specific gravities in which at least one of the plurality of liquids is a dispersion liquid in which a mixture of nanocarbons with different properties is dispersed;

a step of sequentially injecting the plurality of liquids into an electrophoresis tank so that the specific gravities of the liquids decrease from a bottom to a top of the liquids in a direction of gravitational force; and a step of separating the mixture of the nanocarbons by moving a part of the mixture of the nanocarbons toward an electrode side disposed in an upper part of the electrophoresis tank and moving a remainder of the mixture of the nanocarbons toward an electrode side disposed in a lower part of the electrophoresis tank by applying a direct current voltage to the electrodes disposed in the upper part and the lower part, wherein the electrode disposed in the upper part of the electrophoresis tank is a negative electrode and the electrode disposed in the lower part of the electrophoresis tank is a positive electrode.

* * * * *